United States Patent
Watkins

(10) Patent No.: US 11,292,614 B2
(45) Date of Patent: Apr. 5, 2022

(54) METHOD FOR PRODUCING AN AIRCRAFT

(71) Applicant: THE BOEING COMPANY, Chicago, IL (US)

(72) Inventor: Jessica Lynn Watkins, Bothell, WA (US)

(73) Assignee: THE BOEING COMPANY, Chicago, IL (US)

( * ) Notice: Subject to any disclaimer, the term of this patent is extended or adjusted under 35 U.S.C. 154(b) by 461 days.

(21) Appl. No.: 16/423,434

(22) Filed: May 28, 2019

(65) Prior Publication Data

US 2020/0377230 A1 Dec. 3, 2020

(51) Int. Cl.
*B64F 5/10* (2017.01)
*G06Q 50/04* (2012.01)

(52) U.S. Cl.
CPC .............. *B64F 5/10* (2017.01); *G06Q 50/04* (2013.01)

(58) Field of Classification Search
CPC ............................ G05B 19/41805; B64F 5/10
See application file for complete search history.

(56) References Cited

U.S. PATENT DOCUMENTS

| | | | | |
|---|---|---|---|---|
| 4,956,764 A | * | 9/1990 | Carver ..................... | G06T 17/00 700/59 |
| 5,005,277 A | * | 4/1991 | Uemura ................ | B62D 65/028 29/407.04 |
| 5,980,084 A | * | 11/1999 | Jones ................ | G05B 19/41805 700/95 |
| 7,756,321 B2 | | 7/2010 | Marsh et al. | |
| 8,005,563 B2 | | 8/2011 | Cobb et al. | |
| 10,317,886 B1 | * | 6/2019 | Arthur ..................... | G01B 11/24 |
| 10,450,053 B2 | * | 10/2019 | Doyle ..................... | G01B 11/14 |
| 10,712,730 B2 | * | 7/2020 | Borowicz ................. | B64F 5/10 |
| 11,117,228 B2 | * | 9/2021 | Kikuchi .................... | B64F 5/10 |
| 2015/0356236 A1 | * | 12/2015 | Bense ....................... | B64F 5/10 703/8 |
| 2017/0132355 A1 | | 5/2017 | Vasquez et al. | |
| 2017/0210489 A1 | * | 7/2017 | Bode ..................... | G05B 19/402 |
| 2017/0369186 A1 | * | 12/2017 | Goto ..................... | B25J 9/1687 |
| 2018/0050824 A1 | * | 2/2018 | Regnault .................. | B64F 5/10 |

* cited by examiner

*Primary Examiner* — Jason L Vaughan
(74) *Attorney, Agent, or Firm* — The Small Patent Law Group LLC; Jay J. Hoette

(57) ABSTRACT

A method for producing an aircraft includes determining structural dimensional requirements for mating parts and for assembly tolerances between the mating parts. The method develops a datum specification for the mating parts and develops an index specification for mating the mating parts. The method performs a variation analysis based on the datum specification and the index specification to determine assembly analysis results for the mating parts. The method compares the assembly analysis results for the mating parts with the corresponding assembly tolerances defined in the structural dimensional requirements for the mating parts to verify that the datum specification and the index specification meet the assembly tolerances between the mating parts.

27 Claims, 19 Drawing Sheets

METHOD FOR PRODUCING AN AIRCRAFT

BACKGROUND

The subject matter herein relates generally to a method for producing an aircraft.

Aircraft manufacturing occurs in a manufacturing facility. Many aircraft parts need to be completed and assembled. Design of aircraft parts is time consuming and labor intensive. The assembly process for an aircraft involves fitting, aligning and joining large, complex parts. For example, wing assemblies and tail assemblies may be assembled substantially whole and then attached to the corresponding section of the aircraft body. As another example, the fuselage of the aircraft may be the combination of several body assemblies. The parts of the aircraft are assembled with high accuracy, such as with relative positional tolerances between the parts of less than 0.005 inch (about 0.1 millimeters). During the life of an aircraft program or in the design of a new aircraft program, various aircraft parts may need to be redesigned, which may change locations of structurally significant features of the aircraft part. Other aircraft parts typically need to be redesigned to accommodate such changes to ensure assembly and build tolerances of the aircraft. Redesign of parts at later stages of the aircraft design are typically more costly and affect redesign of a greater number of parts.

A need remains for a method of producing an aircraft in a cost effective and reliable manner to maintain functional integrity of the aircraft and quality standards of the aircraft program.

BRIEF DESCRIPTION

In one example, a method for producing an aircraft is provided. The method determines structural dimensional requirements for mating parts of a first aircraft component, for mating parts of a second aircraft component, and for assembly tolerances between the mating parts of the first and second aircraft components. The method develops a datum specification for the mating parts of the first aircraft component and for the mating parts of the second aircraft component and develops an index specification for mating the mating parts of the first aircraft component with the mating parts of the second aircraft component. The method performs a variation analysis based on the datum specification and the index specification to determine assembly analysis results for the mating parts of the first and second aircraft components. The method compares the assembly analysis results for the mating parts of the first and second aircraft components with the assembly tolerances determined by the structural dimensional requirements for the mating parts of the first and second aircraft components to verify that the datum specification and the index specification meet the assembly tolerances between the mating parts of the first aircraft component and the mating parts of the second aircraft component.

In another example, a method for producing an aircraft is provided. The method determines structural dimensional requirements for mating parts of a first aircraft component, for mating parts of a second aircraft component, and for assembly tolerances between the mating parts of the first and second aircraft components. The method develops a datum specification for the mating parts of the first aircraft component and for the mating parts of the second aircraft component and develops an index specification. The index specification defines an assembly sequence for mating the mating parts of the first aircraft component with the mating parts of the second aircraft component. The method performs a variation analysis based on the datum specification and the index specification to determine assembly analysis results for the mating parts of the first and second aircraft components. The method compares the assembly analysis results for the mating parts with the assembly tolerances determined by the structural dimensional requirements for the mating parts of the first and second aircraft components to verify that the datum specification and the index specification meet the assembly tolerances between the mating parts of the first aircraft component and the mating parts of the second aircraft component. The method assembles the first aircraft component with the second aircraft component according to the assembly sequence based on the index specification and the datum specification.

In a further example, a method for producing an aircraft by a wing-to-body-join assembly is provided. The method determines structural dimensional requirements for wing assembly mating parts of a wing assembly including a center wing section, a right wing section attached to the center wing section, and a left wing section attached to the center wing section. The method determines structural dimensional requirements for fuselage mating parts of a fuselage including a mid-body section configured to receive the wing assembly and determines structural dimensional requirements for assembly tolerances between the wing assembly mating parts and the fuselage mating parts. The method develops a datum specification for the wing assembly mating parts and for the fuselage mating parts and develops an index specification for mating the wing assembly mating parts with the fuselage mating parts. The method performs a variation analysis based on the datum specification and the index specification to determine assembly analysis results for the wing assembly mating parts and the fuselage mating parts. The method compares the assembly analysis results with the assembly tolerances determined by the structural dimensional requirements to verify that the datum specification and the index specification meet the assembly tolerances between the wing assembly mating parts and the fuselage mating parts.

DETAILED DESCRIPTION

Figure 1:
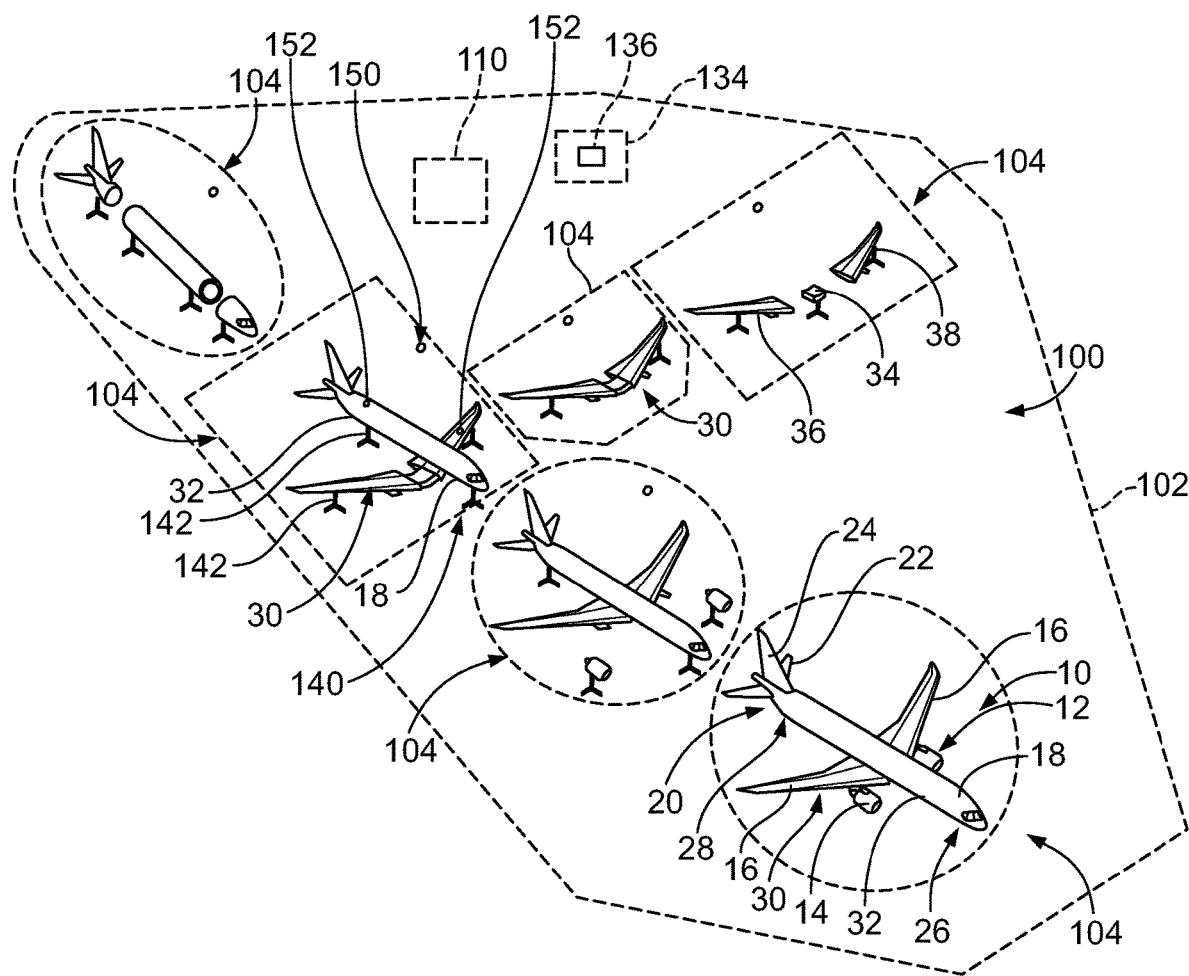
FIG. 1 is a perspective view of an assembly system in accordance with an example used to assemble a vehicle, such as an aircraft in accordance with an example.

Examples described herein provide systems and methods for performing a producibility analysis for an engineering design (product) and build (process), such as for an aircraft. The systems and methods are used in manufacturing parts of the aircraft, such as for joining parts of the aircraft together. In various examples, the systems and methods are used for a wing-to-body-join assembly for the aircraft. In other various examples, the systems and methods may be used for other parts of the aircraft, such as for joining the tail to the fuselage, for joining body sections of the fuselage together, for joining the nose to the fuselage, for joining the engines to the wings, for joining the wings to the center wing section, for joining wing leading edge panels together, for joining pylons to wings, for joining interior aircraft components together, or for joining other parts of the aircraft.

Examples of the producibility analysis system utilize a variation analysis process to analyze the manufacturability of the engineering design and build to verify that the engineering design and build are within a manufacturing capability of a manufacturing facility for producing the aircraft. Examples described herein utilize a datum specification and an index specification to perform a variation analysis to verify that, within the structural dimensional requirements for the mating parts of the components being joined, the design and build sequence are within assembly tolerances for the components being joined. Examples of the producibility analysis system define structural dimensional requirements for the mating parts being joined and compares the structural dimensional requirements with the manufacturing capabilities to negotiate assembly tolerances with the engineering design.

Examples of the systems and methods described herein may be employed at early design stages to focus design resources on areas of issue and to avoid redesign or rework at later stages. The producibility analysis method is performed to determine if one or more of the parts contributes to undesirable geometric variations that may result in negative margins (for example, interference of parts), require design revisions, require tool revisions, or require revisions to the build indexing specification for joining the parts. The producibility analysis system identifies and avoids costly design deficiencies or poorly planned manufacturing methodologies at early design stages. The producibility analysis system verifies the build sequence, prioritizes placement of key features of the parts, and analyzes design and build constraints to verify that the parts can be efficiently assembled or disassembled. The producibility analysis method is performed virtually, such as using 3-D solid models, to enable graphical visualization and direct manipulation within a simulated manufacturing environment. The producibility analysis method has the capability of being easily updated as the engineering design and build mature over time.

FIG. 1 is a perspective view of an assembly system 100 in accordance with an example used to assemble a vehicle, such as an aircraft 10. While the assembly system 100 is illustrated and described herein with reference to design and manufacture of the aircraft 10, it is realized that the assembly system 100 may be used for other types of vehicles, such as automotive vehicles, watercraft vehicles, military vehicles, other types of aerospace vehicles, and the like. The assembly system 100 may be provided in a manufacturing facility 102. The aircraft 10 may be manufactured in stages at various stations 104 within the manufacturing facility 102. For example, various parts of the aircraft 10 may be preassembled at one or more stations (or at other remote manufacturing facilities) and joined at other stations within the manufacturing facility 102 to complete the aircraft 10. The assembly system 100 utilizes a producibility analysis system 110 to analyze the manufacturability of various components to verify that the engineering design of the components and the build sequence for joining the various components are within a manufacturing capability of the manufacturing facility 102 for producing the aircraft 10. The producibility analysis system 110 may be provided within the manufacturing facility 102 or may be located remote from the manufacturing facility 102.

The aircraft 10 may be a commercial aircraft, a military aircraft, a helicopter, or another type of aircraft 10. The aircraft 10, in the illustrated example, includes a propulsion system 12 with two engines 14 for propelling the aircraft 10. The engines 14 may be gas turbine engines. Optionally, the propulsion system 12 may include more engines 14 than shown. The engines 14 may be carried by wings 16 of the aircraft 10. In other examples, the engines 14 may be carried by a fuselage 18 and/or an empennage 20. The empennage 20 includes horizontal stabilizers 22 and a vertical stabilizer 24. The fuselage 18 of the aircraft 10 may define interior compartments or areas, such as a passenger cabin, a flight deck, a cargo area, and/or the like. The aircraft 10 includes a nose 26 and a tail 28 at opposite ends of the fuselage 18.

In an example, the aircraft 10 includes a wing assembly 30 configured to be joined to a mid-body section 32 of the fuselage 18. The wing assembly 30 may be preassembled and joined to the mid-body section 32 of the fuselage 18 during a wing-to-body-join process. In other various examples, the right and left wings may be joined directly to the mid-body section 32 of the fuselage 18 rather than being preassembled as the wing assembly 30. The wing assembly 30 includes a center wing section 34, a right wing section 36, and a left wing section 38. The center wing section 34, the right wing section 36, and the left wing section 38 are separately assembled and joined at one or more wing build stations.

In various examples, the tail 28 is joined to the body of the fuselage 18 at a tail join station. The wing assembly 30 is transported as a completed unit for joining to the fuselage 18 at a wing join station. The engines 14 are attached to the wings 16 at an engine join station. The aircraft 10 may be transferred to one or more aircraft processing stations downstream of the engine join station. Other components may be joined or assembled at these or other stations during the manufacture of the aircraft 10. The producibility analysis system 110 analyzes the manufacturability of the various components (for example, fuselage body sections, tail, nose, wing assembly, engines, and the like) to verify that the engineering design (for example, size, shape, location of structural features of the mating parts of the components) and the build sequence (for example, a build order in which mating parts are brought together including movement steps to locate the mating parts relative to each other) meet assembly and design tolerances for joining the parts of the components.

In an example, the producibility analysis system 110 determines structural dimensional requirements for the various mating parts and for assembly tolerances between the mating parts. The producibility analysis system 110 develops a datum specification for the mating parts and develops an index specification for mating the mating parts. The datum specification includes datum features for the mating parts and datum reference planes for the mating parts that define a datum reference frame. The datum reference frame defines the coordinate system for the mating part to define the orientation of the mating part in space. The index specification includes a build sequence for orienting the datum reference frames relative to each other. The producibility analysis system 110 performs a variation analysis based on the datum specification and the index specification to determine assembly analysis results for the mating parts and compares the assembly analysis results for the mating parts with the corresponding assembly tolerances defined in the structural dimensional requirements for the mating parts. The producibility analysis system 110 verifies that the datum specification and the index specification meet the assembly tolerances between the mating parts.

The producibility analysis system 110 can include or represent hardware and associated instructions (e.g., software stored on a tangible and non-transitory computer readable storage medium, such as a computer hard drive, ROM, RAM, or the like) that perform the operations described herein. The hardware may include electronic circuits that include and/or are connected to one or more logic-based devices, such as microprocessors, processors, controllers, or the like. These devices may be off-the-shelf devices that perform the operations from the instructions described herein. Additionally or alternatively, one or more of these devices may be hard-wired with logic circuits to perform these operations.

In an example, the assembly system 100 includes a positioning system 134 having a controller 136 for controlling positions of the components at the various stations within the manufacturing facility 102. The positioning system 134 is communicatively coupled to the producibility analysis system 110. The producibility analysis system 110 may determine a build sequence for the components, such as based on a virtual joining simulation using 3-D solid models, which enable graphical visualization and direct manipulation within a simulated manufacturing environment. The verified build sequence may be shared with (for example, uploaded to) the positioning system 134. The positioning system 134 uses the build sequence to control positioning of the components during manufacture of the aircraft 10.

The assembly system 100 includes a motion system 140 having component support tools 142 for supporting the components and moving the components within the stations, such as during a joining process. The component support tools 142 are movable within the work area of the manufacturing facility 102, such as between the various stations and within the various stations for positioning the components relative to each other. In various examples, the component support tools 142 may be computer controlled and programmable. For example, the component support tools 142 may be operably coupled to the controller 136 of the positioning system 134. The controller 136 may control movement and positioning of the component support tools 142 according to a defined build sequence. The component support tools 142 may be movable along predefined paths. In various examples, the component support tools 142 may be driven and manipulated by an operator in addition to or in lieu of the controller 136.

In an example, the component support tools 142 may include cranes or other types of overhead supports for supporting the components from overhead. In other various examples, the component support tools 142 may include jack towers, pogo supports, or other types of supports for supporting the components from below. The component support tools 142 may be supported by crawlers that allow movement of the component support tools 142 between the various stations. In other various examples, the component support tools 142 may be supported by carriages on rails to facilitate movement between the various stations. Other types of components support tools 142 may be used in alternative examples to support the components and allow movement between the various stations.

In an example, the assembly system 100 includes a metrology system 150 having at least one tracking device 152 for locating the components in the work area of the manufacturing facility 102. The controller 136 is communicatively coupled to the tracking device 152 and receives position data from the tracking device 152. In various examples, the tracking device 152 is a laser tracking device configured to determine positions of the components using one or more laser beams. The components may include reflectors, such as retro reflectors for positioning by the tracking device 152. In other various examples, the tracking device 152 may be an image tracking device, such as a camera configured to detect positions of the components based on images obtained by the camera. Other types of tracking devices 152 may be used in alternative examples. In an example, the controller 136 controls relative positioning of the component support tools 142 in the work area of the manufacturing facility 102 based on the position data obtained by the tracking device 152.

Figure 2:
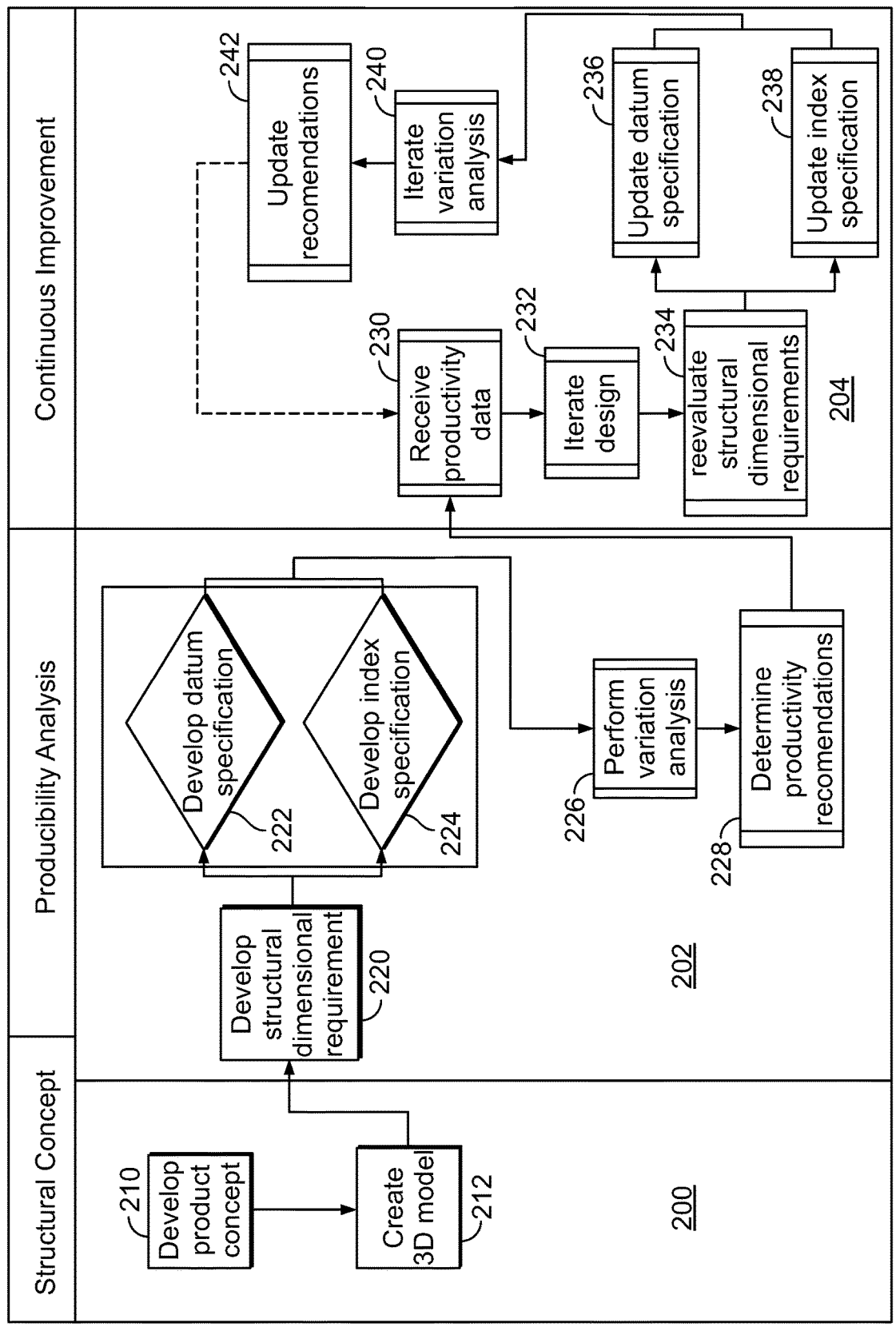
FIG. 2 is a process flow chart for producing an aircraft in accordance with an example.

FIG. 2 is a process flow chart for producing an aircraft 10 in accordance with an example. FIG. 2 illustrates processes performed, such as by the producibility analysis system 110. Various processes may be performed by the producibility analysis system 110 sequentially and the processes may be iterated numerous times, such as with one or more changes to input parameters, to verify an operable build sequence and/or prioritize placement of key features of the parts and/or analyze design and build constraints to verify that the parts can be efficiently assembled or disassembled. The producibility analysis system 110 performs the process steps to determine if one or more of the parts contributes to undesirable geometric variations that may result in negative margins (for example, interference of parts), require design revisions, require tool revisions, or require revisions to the build indexing specification for joining the parts.

During a design process for the aircraft 10, the producibility analysis system 110 is used to perform a producibility analysis to prove out or determine the feasibility of one or more build sequences. The producibility analysis system 110 uses variation analysis to predict the effects of variation in the assembly process to verify that the build sequence(s) can be used for production of the aircraft 10. At a first stage 200, a structural concept is created defining the structural features of the components and the inter-relation between the components. At a second stage 202, a producibility analysis is performed to verify that the engineering design and the build sequence are feasible. At a third stage 204, the structural concept is refined and/or the producibility analysis is reiterated to provide continuous improvement of the engineering design and the build sequence to provide one or more recommendations.

At the first stage 200, a product concept is developed at step 210 and models of the initial concept, such as CAD models, are created at step 212. In an example, developing the product concept includes defining sizes of the mating parts of the components, defining shapes of the mating parts of the components, defining locations of structural features of the mating parts of the components, defining the relative locations of the mating parts of the components, and the like. After the product concept is developed and modeled, the producibility analysis system 110 is used to verify that the mating parts are capable of being joined and manufactured.

At the second stage 202, structural dimensional requirements are developed at step 220, a datum specification is developed at step 222, an index specification is developed at step 224, a variation analysis is performed at step 226, and producibility recommendations are determined at step 228.

In an example, developing the structural dimensional requirements (step 220) includes establishing working assumptions to be used in the variation analysis, such as the parts being rigid bodies, no deflection in the parts, no deflection in the component support tools, no temperature variation, materials of the parts, and the like. Developing the structural dimensional requirements (step 220) includes defining structural features of the mating parts, such as dimensions, shapes of surfaces, locations of structural features (for example, surfaces edges, holes, brackets, and the like), and the like. Developing the structural dimensional requirements (step 220) includes defining tolerances, such as manufacturing tolerances for the parts, assembly tolerances between the parts, and the like. Developing the structural dimensional requirements (step 220) includes defining conditions of failure and consequences due to failure.

In an example, developing the datum specification (step 222) includes identifying datum features for the mating parts. A datum feature is a physical feature of the mating part. The datum features may be surfaces, edges, openings, protrusions, or other datum features associated with the mating parts. Each mating part includes at least one datum feature. The datum feature(s) is used to define a datum plane of the datum specification through or along the mating part. The mating parts have corresponding datum features that are aligned and positioned relative to each other during joining of the mating parts. The datum specification may be developed by defining primary datum features of a first mating part of the first aircraft component and defining secondary datum features of a first mating part of the second aircraft component. The datum specification may be developed by defining a datum reference frame for each mating part. The datum reference frame is defined by three mutually perpendicular planes that establish a coordinate system of the mating part. Tolerances of the mating part locations may be defined relative to the datum reference frame. The datum specification may include three mutually perpendicular first aircraft component datum planes for the mating parts of the first aircraft component and include three mutually perpendicular second aircraft component datum planes for the mating parts of the second aircraft component.

In an example, developing the index specification (step 224) includes establishing build sequence for positioning the mating parts relative to each other. The build sequence is a step-by-step process to move the mating parts into position relative to each other. Optionally, one mating part may be in a fixed position and the other mating part may be moved into position relative to the fixed mating part. In other examples, both mating parts may be moved, either sequentially or simultaneously. The build sequence includes movements in three-dimensional space, such as with six degrees of freedom. For example, the movable mating part(s) may be movable by translating along any of the mutually perpendicular X, Y and Z axes, as well as movable by changing orientation between those axes through rotation at a roll angle, a pitch angle, and a yaw angle; where movement along the X axis defines front and rear movement; movement along the Y axis defines left and right movement; movement along the Z axis defines up and down movement; roll movement defines rotation about the X axis; pitch movement defines rotation about the Y axis; and yaw movement defines rotation about the Z axis. The index specification may be developed by developing an assembly sequence to position the primary datum features (for example, the datum reference frame of the first mating part)

and the secondary datum features (for example, the datum reference frame of the second mating part) relative to each other for joining.

In an example, the variation analysis (step 226) is based on the datum specification and the index specification. The variation analysis is performed using a control system, such as a 3-D control system. The variation analysis virtually simulates assembly of the mating components according to the build sequence to determine assembly analysis results between the mating parts. The variation analysis determines if the build sequence is feasible (for example, within a manufacturing capability). The variation analysis determines if one or more of the mating parts contributes to undesirable geometric variations that may result in negative margins (for example, from interference of the mating parts). The variation analysis determines if all of the datum features are capable of being located at proper locations within the assembly tolerances defined by the structural dimensional requirements.

In an example, the producibility recommendations (step 228) include providing a report of the findings relating to the feasibility of manufacturing the components according to the particular build sequence(s). If the build sequence is approved, the producibility recommendations (step 228) may include providing an approval recommendation approving the build sequence as being feasible. If the build sequence is denied, the producibility recommendations (step 228) may include providing a report indicating areas of concern or failure. The producibility recommendations (step 228) may include providing a results report indicating assembly tolerances for each of the datum features for the components as recommendations. The producibility recommendations (step 228) may include providing remedies as recommendations. The producibility recommendations may be used by the design team to evaluate the build sequence. For example, the design team may approve of the build sequence and send the build sequence to the assembly system 100 to build the aircraft according to the approved build sequence. The design team may modify the structural dimensional requirements of one or more of the mating parts.

At the third stage 204, a feedback loop is provided to be utilized throughout the life cycle of the design of the aircraft 10 and/or throughout the life cycle of the manufacturing of the aircraft 10. The design may be changed or updated to continually improve the design of the aircraft 10. At the third stage 204, the producibility analysis system 110 receives producibility data at step 230. The producibility analysis system 110 iterates the product design at step 232, such as to revise or change the shape of the mating component, the location of one or more structural features, and the like. The producibility analysis system 110 re-evaluates the structural dimensional requirements at step 234, such as to correspond to the revisions in the product design. The producibility analysis system 110 updates the datum specification at step 236, if needed to correspond to the revisions in the product design. The producibility analysis system 110 updates the index specification at step 238, if needed to correspond to the revisions in the product design. The producibility analysis system 110 iterates the variation analysis at step 240 based on the revised datum specifications and the revised index specifications. The producibility analysis system 110 determines revised producibility recommendations at step 242. The recommendations are sent to the design team for additional feedback for continuous improvement of the engineering design and the build sequence.

Figure 3:
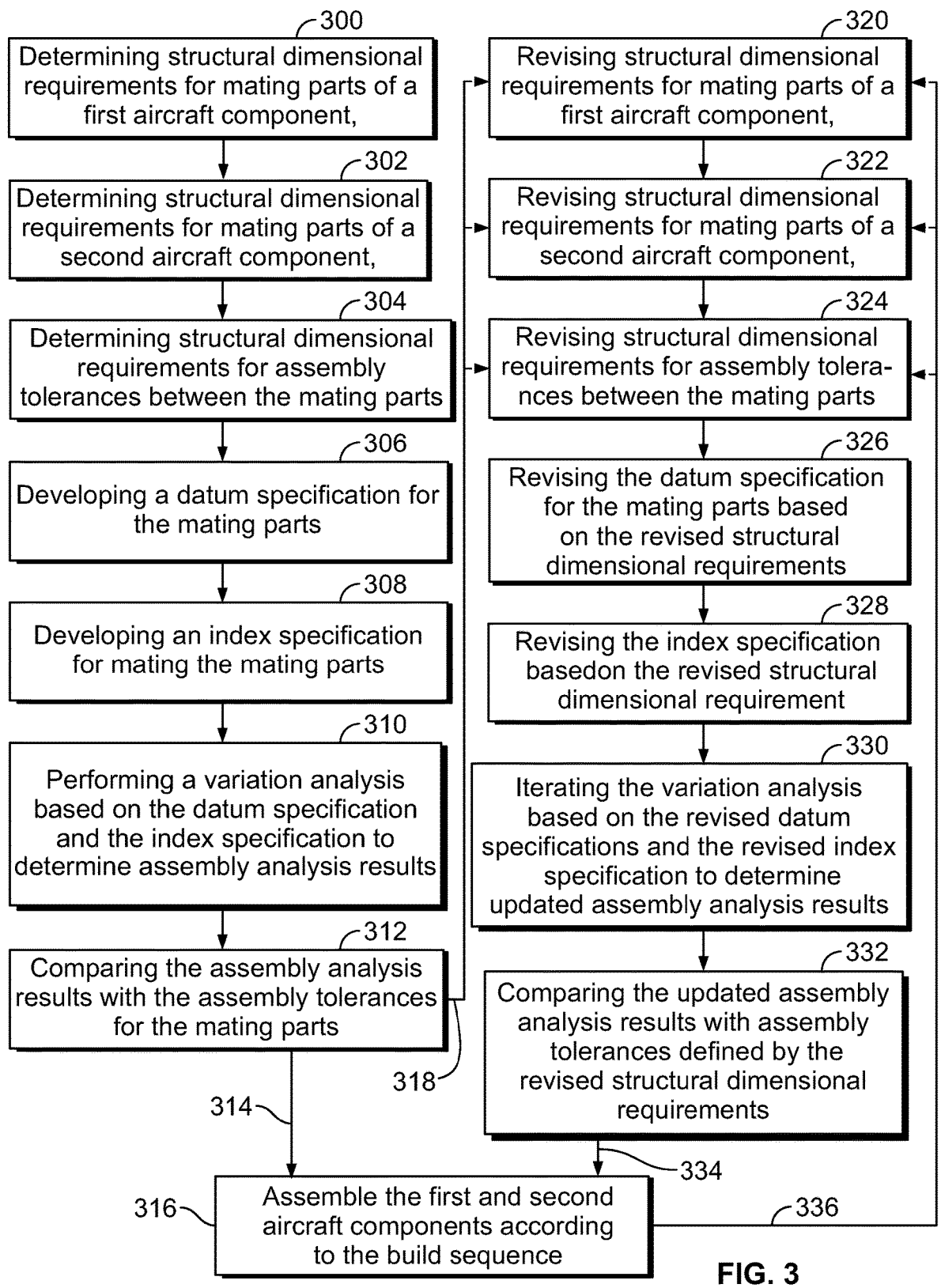
FIG. 3 is a process flow chart for producing an aircraft in accordance with an example.

FIG. 3 is a process flow chart for producing an aircraft 10 in accordance with an example. FIG. 3 illustrates processes performed, such as by the producibility analysis system 110. Various processes may be performed by the producibility analysis system 110 sequentially and the processes may be iterated numerous times, such as with one or more changes to input parameters, to verify an operable build sequence and/or prioritize placement of key features of the parts and/or analyze design and build constraints to verify that the parts can be efficiently assembled or disassembled. The producibility analysis system 110 performs the process steps to determine if one or more of the parts contributes to undesirable geometric variations that may result in negative margins (for example, interference of parts), require design revisions, require tool revisions, or require revisions to the build indexing specification for joining the parts.

In an example, at step 300, structural dimensional requirements for mating parts of a first aircraft component are determined. At step 302, structural dimensional requirements for mating parts of a second aircraft component are determined. At step 304 structural dimensional requirements for assembly tolerances between the mating parts of the first aircraft component and the corresponding mating parts of the second aircraft component are determined. In an example, the structural dimensional requirements may be determined by the producibility analysis system 110. The structural dimensional requirements may define working assumptions to be used in the variation analysis, such as the parts being rigid bodies, no deflection in the parts, no deflection in the component support tools, no temperature variation, materials of the parts, and the like. The structural dimensional requirements may relate to structural features of the mating parts, such as dimensions, shapes of surfaces, locations of structural features (for example, surfaces edges, holes, brackets, and the like), and the like. The structural dimensional requirements may relate to tolerances associated with the mating parts, such as manufacturing tolerances for the parts, assembly tolerances between the parts, and the like. The structural dimensional requirements may define conditions of failure of the mating parts and consequences due to failure of the mating parts.

In an example, at step 306, datum specifications for the mating parts of the first aircraft component and the mating parts of the second aircraft component are developed. The datum specifications may be based on the structural dimensional requirements. The datum specifications may be developed by identifying datum features for the mating parts. The datum features may be surfaces, edges, openings, protrusions, or other datum features associated with the mating parts. Each mating part includes at least one datum feature. The datum feature may be a datum point or a datum plane through or along the mating part. The mating parts of the first and second aircraft components have corresponding datum features that are aligned and positioned relative to each other during joining of the mating parts.

In an example, at step 308, index specifications for mating the mating parts of the first aircraft component with the mating parts of the second aircraft component are developed. The index specifications establish a build sequence for positioning the mating parts relative to each other. The build sequence is a step-by-step process to move the mating parts into position relative to each other. The build sequence includes movements in three-dimensional space, such as with six degrees of freedom.

In an example, at step 310, a variation analysis is performed based on the datum specification and the index specification to determine assembly analysis results for the mating parts. The variation analysis is performed using a control system, such as a 3D control system. The variation analysis virtually simulates assembly of the mating parts according to the build sequence. The variation analysis determines if the build sequence is feasible.

In an example, at step 312, the assembly analysis results for the mating parts are compared with the corresponding assembly tolerances defined in the structural dimensional requirements for the mating parts. The assembly analysis results are compared with the assembly tolerances to verify that the datum specification and the index specification meet the assembly tolerances between the mating parts of the first aircraft component and the corresponding mating parts of the second aircraft component. The assembly analysis results are compared with the assembly tolerances to verify that the assembly analysis results are within a manufacturing capability of the manufacturing facility for producing the aircraft. The assembly analysis results are compared with the assembly tolerances to determine if one or more of the mating parts contributes to undesirable geometric variations that may result in negative margins (for example, from interference of the mating parts). The assembly analysis results are compared with the assembly tolerances to determine if all of the datum features are capable of being located at proper locations within the assembly tolerances defined by the structural dimensional requirements.

If the assembly analysis results are favorable (for example, within the assembly tolerances), the build sequence is approved at step 314 and the mating parts may be assembled according to the build sequence at step 316. If the assembly analysis results are unfavorable (for example, one or more of the mating surfaces are outside of the assembly tolerances or the index specification is unable to proceed due to failing to meet assembly requirements, such as due to interference of the mating parts), the build sequence is denied at step 318 and the analysis or the design is revised.

In an example, at step 320, the structural dimensional requirements for the mating parts of the first aircraft component are revised. At step 322, the structural dimensional requirements for the mating parts of the second aircraft component are revised. At step 324, the structural dimensional requirements for the assembly tolerances between the mating parts are revised. In an example, the structural dimensional requirements for the mating parts of the first aircraft component, the structural dimensional requirements for the mating parts of the second aircraft component, and the structural dimensional requirements for the assembly tolerances are all revised. In another example, only one or two of the revisions to the structural dimensional requirements are made without making the other revisions to the structural dimensional requirements.

In an example, at step 326, the datum specification for the mating parts is revised based on the revised structural dimensional requirements for the mating parts of the first aircraft component and/or for the mating parts of the second aircraft component. At step 328, the index specification for the mating parts is revised based on the revised structural dimensional requirements and/or the revised datum specification.

In an example, at step 330, a variation analysis is performed based on the revised datum specification and/or the revised index specification to determine revised assembly analysis results for the mating parts. At step 332, the revised assembly analysis results for the mating parts are compared with the corresponding revised assembly tolerances defined in the revised structural dimensional requirements for the mating parts. The revised assembly analysis results are compared with the revised assembly tolerances to verify that the revised datum specification and the revised index specification meet the revised assembly tolerances between the mating parts of the first aircraft component and the corresponding mating parts of the second aircraft component. If the revised assembly analysis results are favorable (for example, within the revised assembly tolerances), the revised build sequence is approved at step 334 and the mating parts may be assembled according to the revised build sequence at step 316. If the revised assembly analysis results are unfavorable (for example, one or more of the revised mating features are outside of the revised assembly tolerances or the revised index specification is unable to proceed due to interference of the mating parts), the revised build sequence is denied at step 336 and the analysis is again revised.

Figure 4:
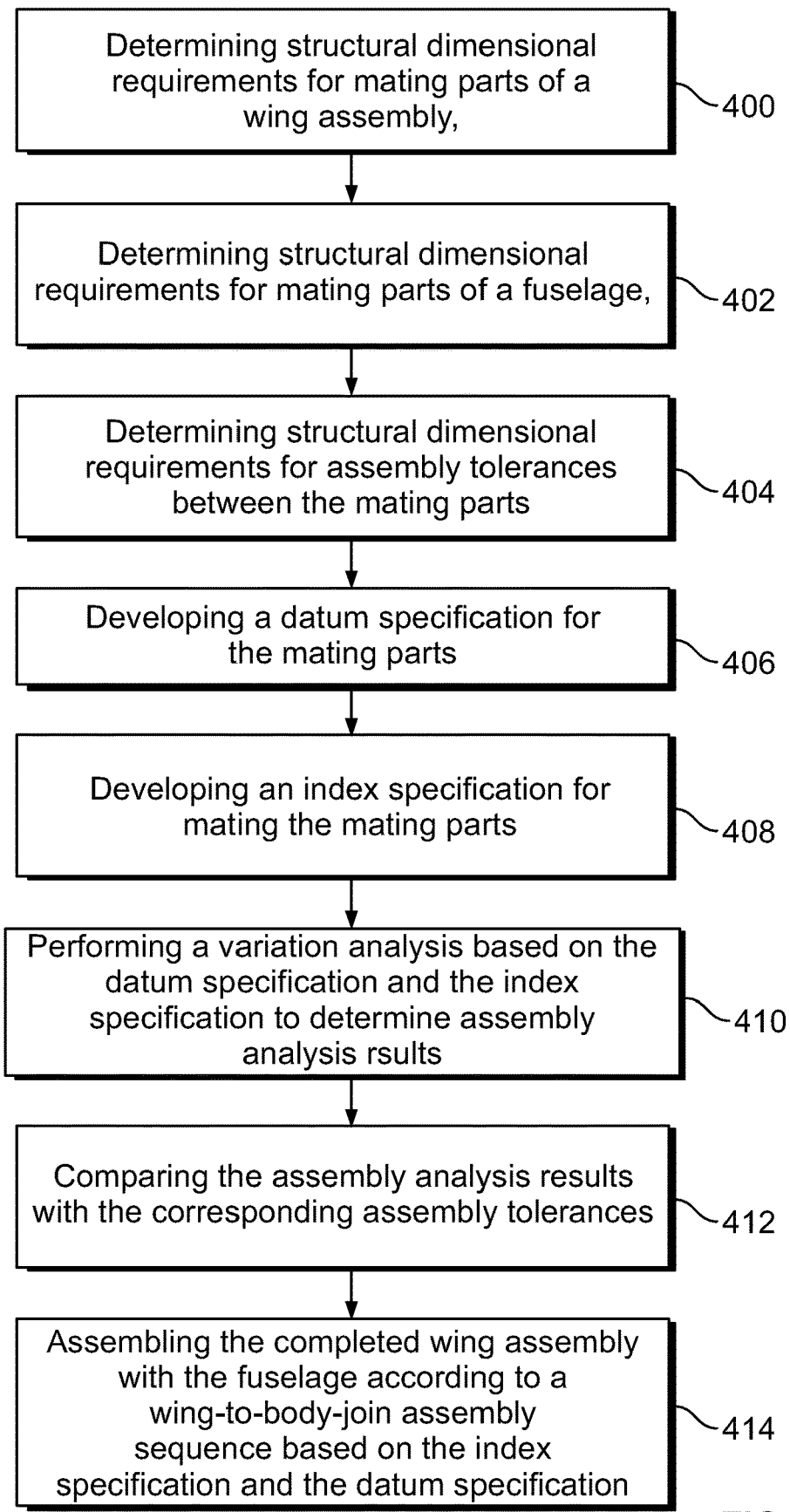
FIG. 4 is a process flow chart for producing an aircraft by a wing-to-body-join assembly process in accordance with an example.

FIG. 4 is a process flow chart for producing an aircraft 10 by a wing-to-body-join assembly process in accordance with an example. FIG. 4 illustrates processes performed, such as by the producibility analysis system 110. The producibility analysis system 110 performs the process steps to determine if one or more of the mating parts or the wing assembly 30 or the body 32 of the fuselage 18 contributes to undesirable geometric variations that may result in negative margins (for example, interference of parts), require design revisions, require tool revisions, or require revisions to the build indexing specification for joining the parts.

In an example, at step 400, structural dimensional requirements for mating parts of the wing assembly 30 are determined. At step 402, structural dimensional requirements for mating parts of the fuselage 18 are determined. At step 404 structural dimensional requirements for assembly tolerances between the mating parts of the wing assembly 30 and the corresponding mating parts of the fuselage 18 are determined. In an example, the structural dimensional requirements of the wing assembly 30 relate to a lower rear spar split epsilon fitting, a lower front spar split epsilon fitting, over wing chords, a wing assembly keel beam, or other mating parts of the wing assembly 30. The structural dimensional requirements of the fuselage 18 relate to an upper rear spar split epsilon fitting, an upper front spar split epsilon fitting, a fuselage longeron, a fuselage keel beam, or other mating parts of the fuselage 18.

In an example, at step 406, datum specifications for the mating parts of the wing assembly 30 and the mating parts of the fuselage 18 are developed. The datum specifications may be based on the structural dimensional requirements. The datum specifications may be developed by identifying datum features for the mating parts. The datum features may be surfaces, edges, openings, protrusions, or other datum features associated with the mating parts.

In an example, at step 408, index specifications for mating the mating parts of the wing assembly 30 with the mating parts of the fuselage 18 are developed. The index specification establishes a build sequence for positioning the mating parts relative to the datum reference frame of each assembly. The build sequence includes movements in three-dimensional space, such as with six degrees of freedom. In an example, the body 32 of the fuselage 18 is fixed during the build sequence and the wing assembly 30 is moved relative to the body 32 of the fuselage 18 according to the build sequence.

In an example, at step 410, a variation analysis is performed based on the datum specification and the index specification to determine assembly analysis results for the mating parts. The variation analysis is performed using a control system, such as a 3D control system. The variation analysis virtually simulates assembly of the mating parts according to the build sequence. The variation analysis determines if the build sequence is feasible.

In an example, at step 412, the assembly analysis results for the mating parts are compared with the corresponding assembly tolerances defined in the structural dimensional requirements for the mating parts. The assembly analysis results are compared with the assembly tolerances to verify that the datum specification and the index specification meet the assembly tolerances between the mating parts of the first aircraft component and the corresponding mating parts of the second aircraft component. The assembly analysis results are compared with the assembly tolerances to verify that the assembly analysis results are within a manufacturing capability of the manufacturing facility for producing the aircraft.

If the assembly analysis results are unfavorable (for example, one or more of the datum specifications are outside of the assembly tolerances or the index specification is unable to proceed due to interference of the mating parts), the build sequence is revised, such as by revising one or more of the structural dimensional requirements and/or the datum specification. If the assembly analysis results are favorable (for example, within the assembly tolerances), the build sequence is approved and the mating parts may be assembled according to the build sequence at step 414. In an example, at step 414, the wing assembly 30 is assembled with the fuselage 18 according to a wing-to-body-join assembly sequence based on the index specification and the datum specification.

Figure 5:
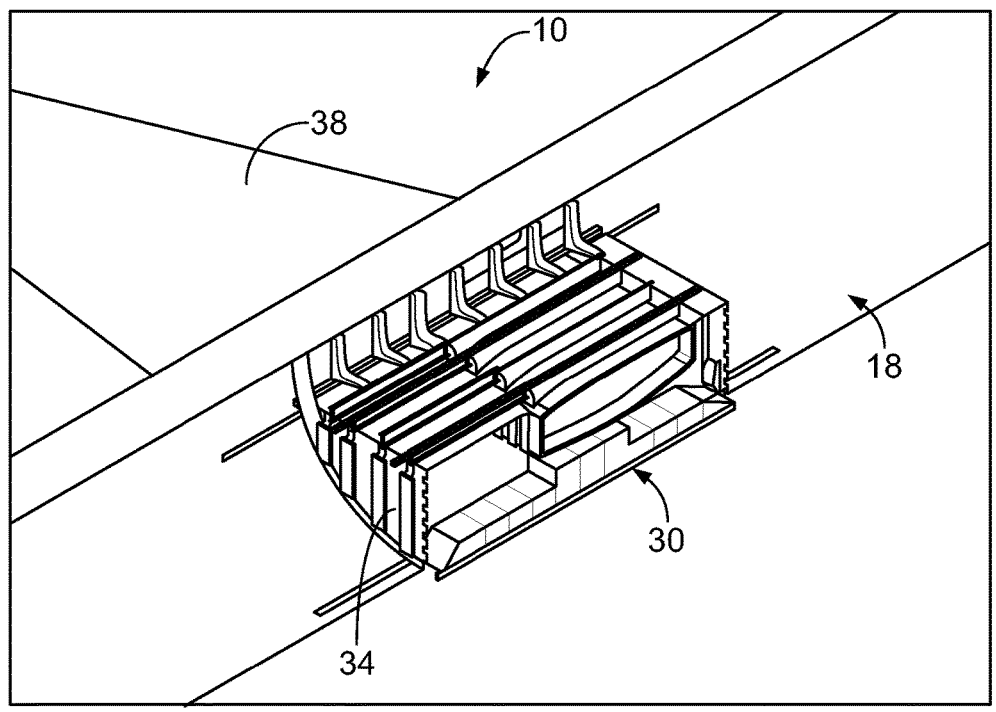
FIG. 5 is a cross-sectional view of a portion of the aircraft illustrating the wing assembly positioned within the fuselage in accordance with an example.

FIG. 5 is a cross-sectional view of a portion of the aircraft 10 illustrating the wing assembly 30 positioned within the fuselage 18. The wing assembly 30 is coupled to the fuselage 18 in accordance with the build sequence validated by the producibility analysis system 110. FIG. 5 illustrates the center wing section 34 and the left wing section 38 of the wing assembly 30 positioned within the fuselage 18. Portions of the fuselage 18 are removed to illustrate the wing assembly 30 positioned within the fuselage 18.

Figure 6:
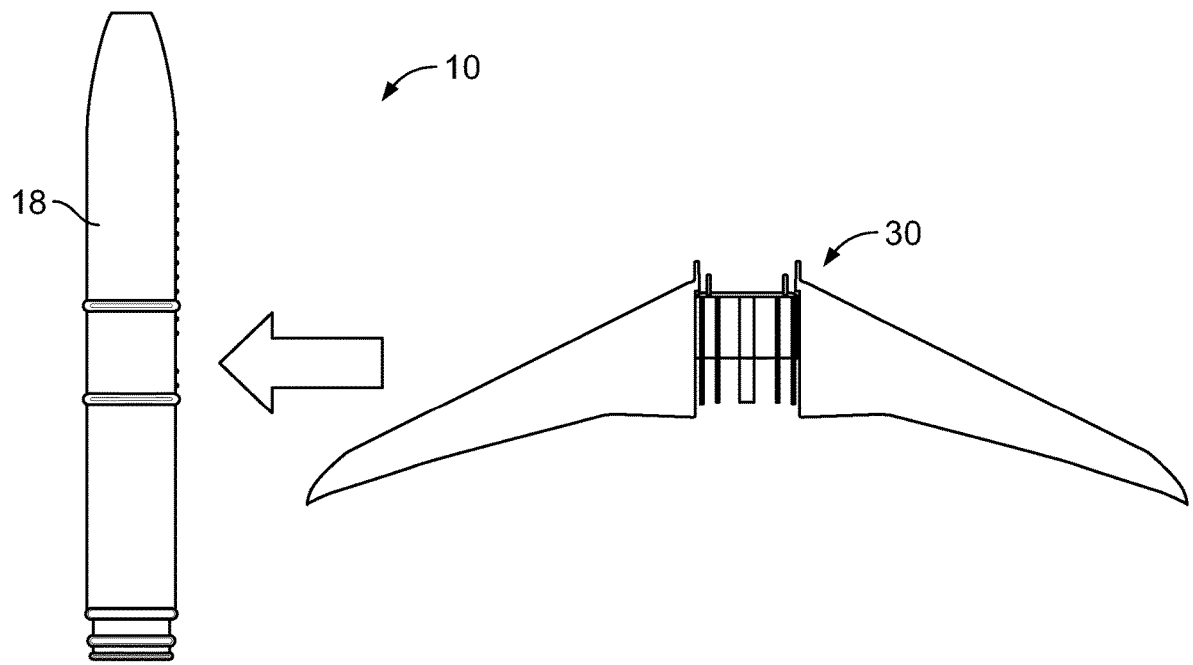
FIG. 6 is a top view of a portion of the aircraft illustrating the wing assembly poised for assembly with the fuselage in accordance with an example.

FIG. 6 is a top view of a portion of the aircraft 10 illustrating the wing assembly 30 poised for assembly with the fuselage 18. The wing assembly 30 is coupled to the fuselage 18 in accordance with the build sequence validated by the producibility analysis system 110. During manufacture, many mating parts of the wing assembly 30 and the fuselage 18 need to be aligned and positioned relative to each other for the wing-to-body-join process. In an example, the mating parts include split epsilon fittings, over wing chords, longerons, stub frame tension straps, trap panel top surfaces, pressure deck edges, keel extensions, and other various surfaces and edges of various mating parts.

FIGS. 7-19 illustrate various examples of 3-D solid models of the aircraft components and mating parts of the aircraft components. The producibility analysis system 110 uses the 3-D solid models when performing the variation analysis to virtually simulate assembly of the first aircraft component and the second aircraft component to determine assembly analysis results between the corresponding mating parts. The producibility analysis system 110 establishes datum features and datum planes as part of the datum specification. The datum specification is used in performing the variation analysis.

Figure 7:
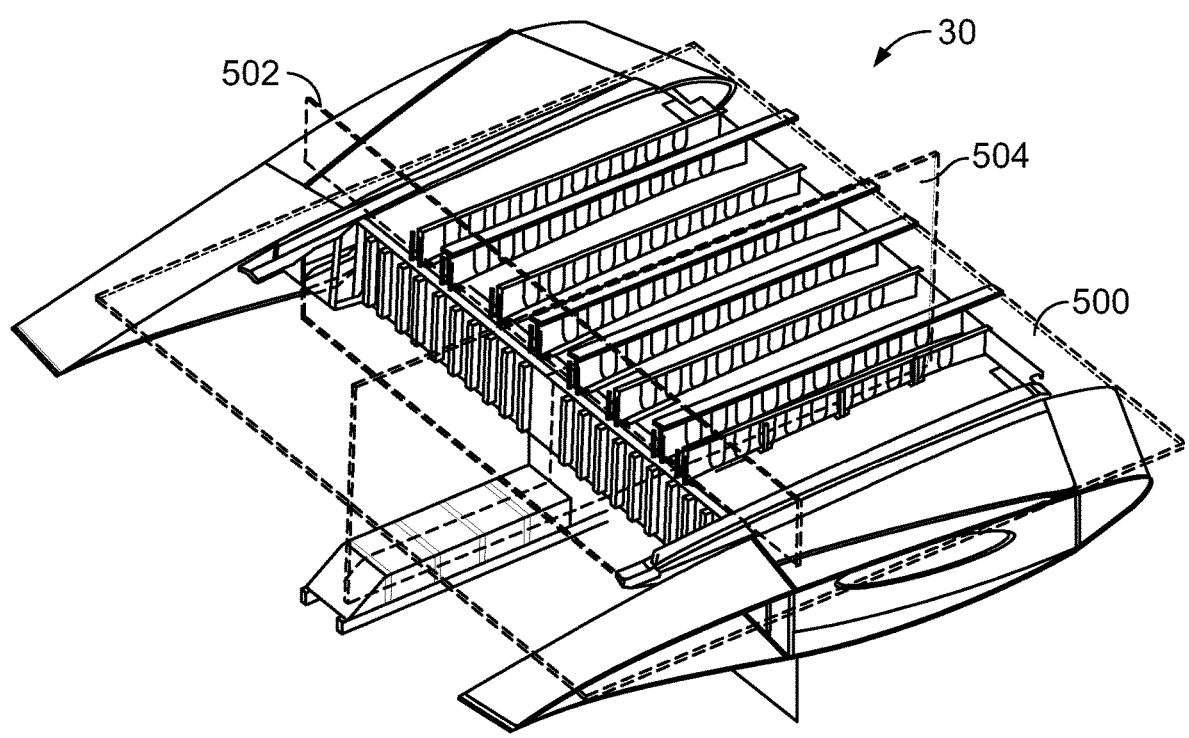
FIG. 7 is a cross-sectional view of a 3-D solid model of the wing assembly illustrating a datum reference frame for the mating parts of the wing assembly in accordance with an example.

FIG. 7 is a cross-sectional view of a 3-D solid model of the wing assembly 30 illustrating a datum reference frame of the datum specification for the mating parts of the wing assembly 30. FIG. 7 illustrates a primary datum plane 500, a secondary datum plane 502, and a tertiary datum plane 504. The datum planes 500, 502, 504 are mutually perpendicular wing assembly datum planes. The primary datum plane 500 is a horizontal datum plane extending front to rear and side-to-side. The secondary datum plane 502 is a vertical datum plane extending top to bottom and side to side. The tertiary datum plane 504 is a vertical datum plane extending top to bottom and front to rear. The datum planes 500, 502, 504 are defined by datum features on corresponding mating parts of the wing assembly 30.

Figure 8:
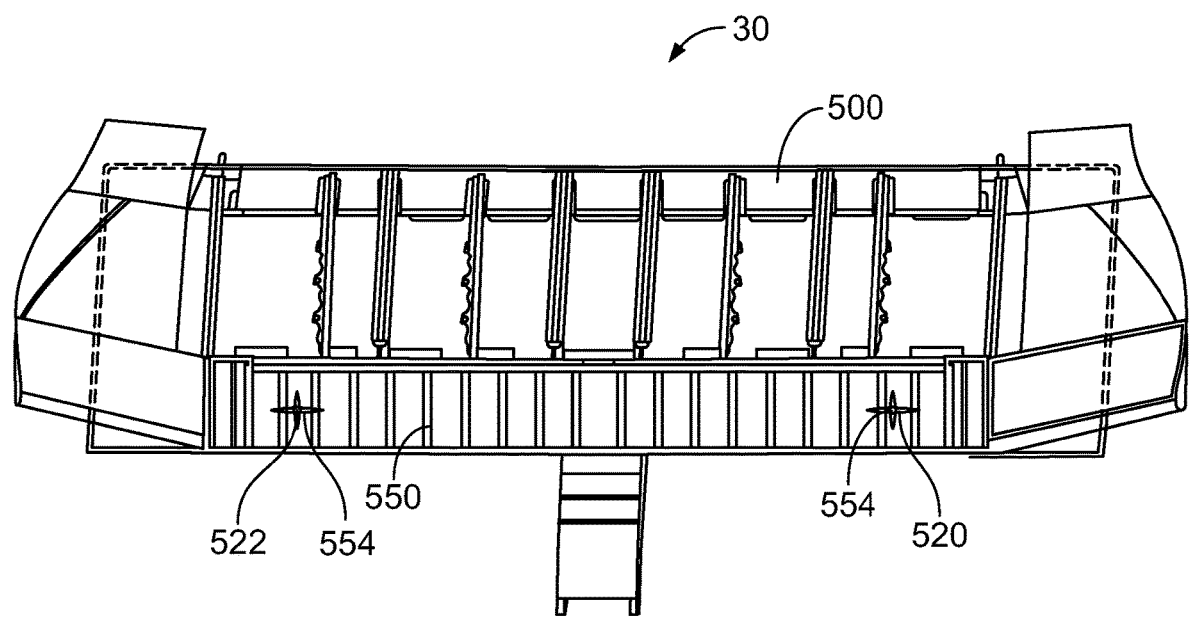
FIG. 8 is a front view of a 3-D solid model of the wing assembly illustrating a datum specification for the mating parts of the wing assembly in accordance with an example.
Figure 9:
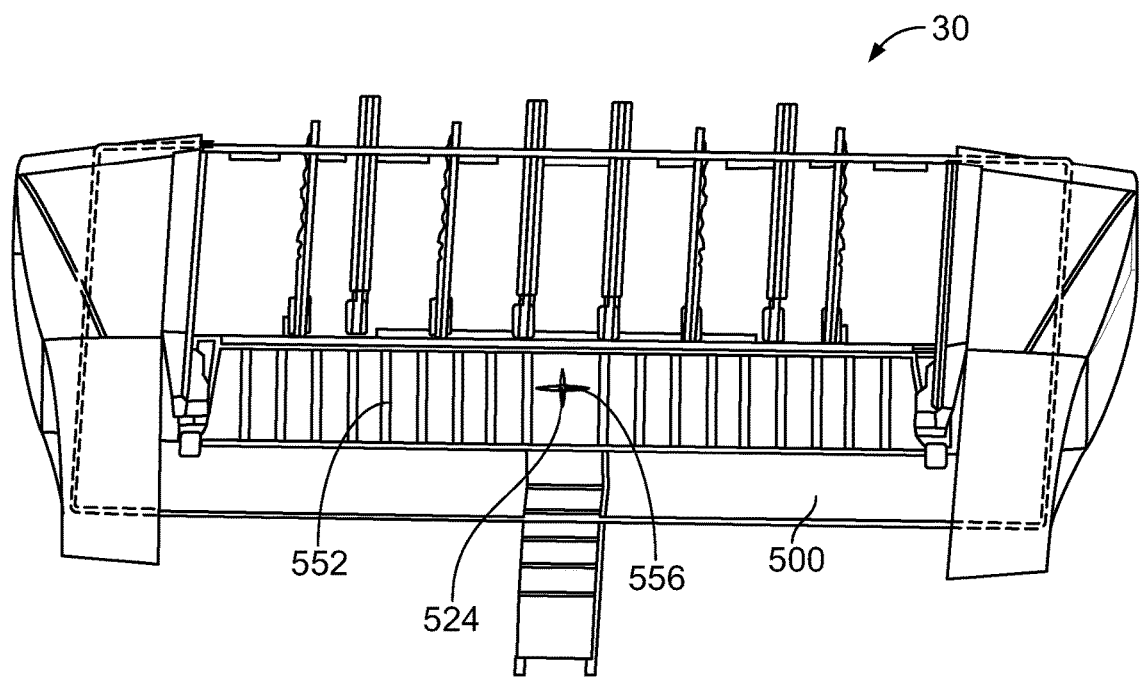
FIG. 9 is a rear view of the 3-D solid model of the wing assembly illustrating a datum specification for the mating parts of the wing assembly in accordance with an example.

FIG. 8 is a rear view of a 3-D solid model of the wing assembly 30 illustrating a datum specification for the mating parts of the wing assembly 30. FIG. 9 is a front view of the 3-D solid model of the wing assembly 30 illustrating a datum specification for the mating parts of the wing assembly 30. FIGS. 8 and 9 illustrate the primary datum plane 500 and datum features 510, 512, 514 used to define the primary datum plane 500. The primary datum plane 500 extends front to rear and side-to-side within the wing assembly 30. In an example, the datum features 510, 512, 514 may be defined by the front spar 550 and the rear spar 552. The datum features 510, 512, 514 may be defined by surfaces, edges, holes or other features of the front and rear spars 550, 552. The datum features 510, 512 may be defined by holes 554 in the front spar 550. The datum feature 514 may be defined by the center hole 556 in the rear spar 552. Other datum features may be used to define the primary datum plane 500 in other examples.

Figure 10:
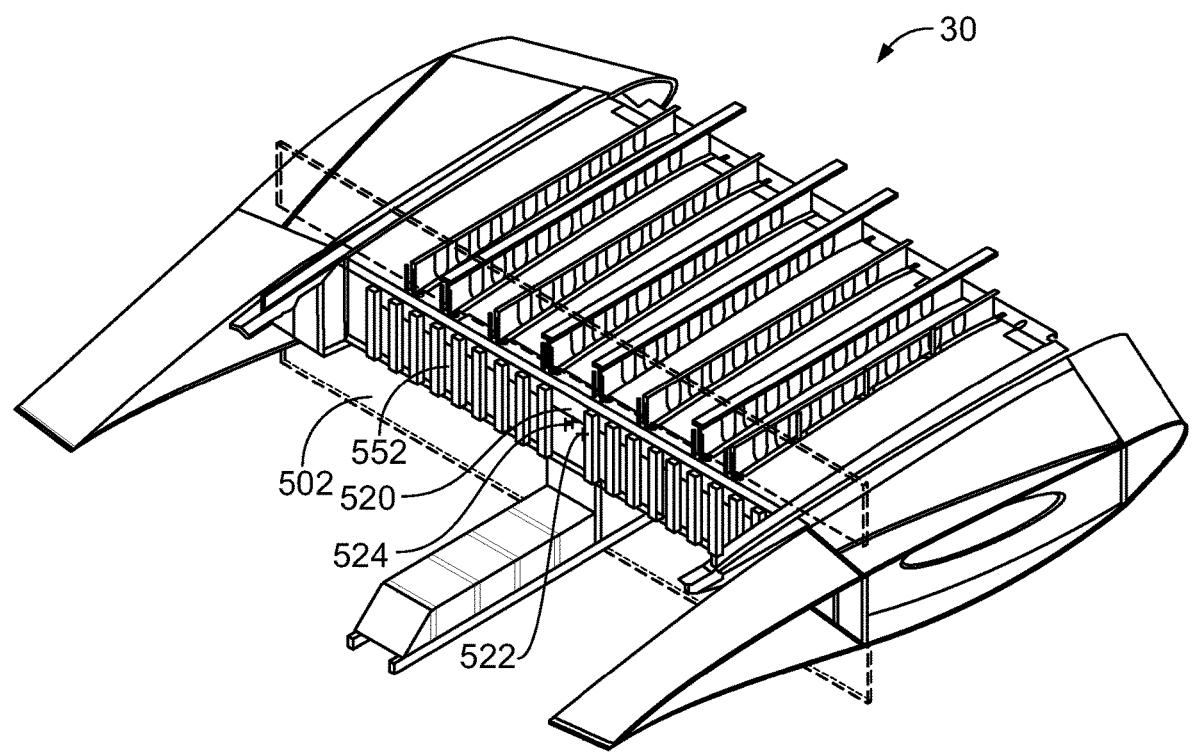
FIG. 10 is a rear perspective view of a 3-D solid model of the wing assembly illustrating a datum plane for the mating parts of the wing assembly in accordance with an example.
Figure 11:
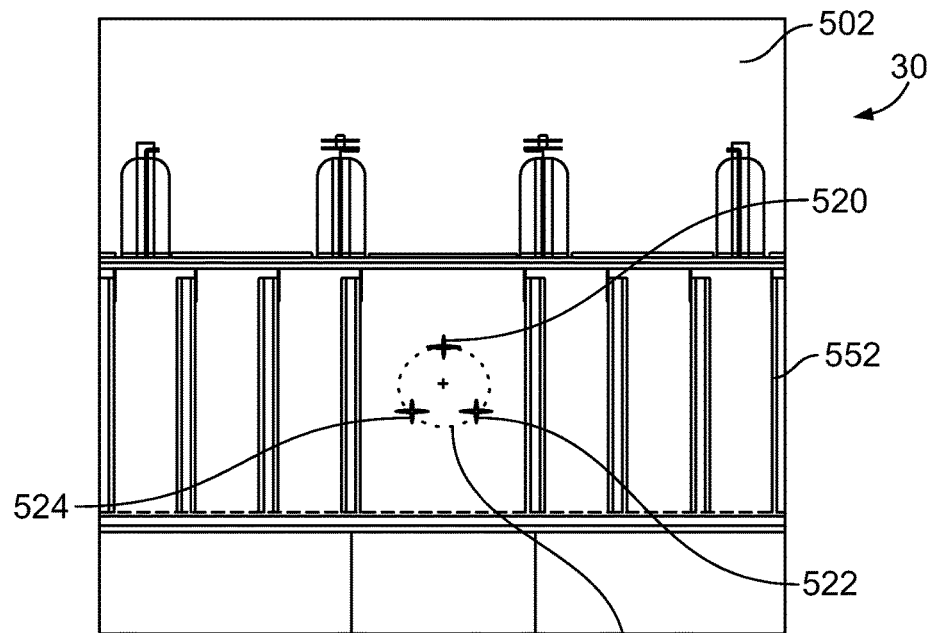
FIG. 11 is a rear view of the 3-D solid model of the wing assembly illustrating a datum feature for the mating parts of the wing assembly in accordance with an example.

FIG. 10 is a rear perspective view of a 3-D solid model of the wing assembly 30 illustrating a datum specification for the mating parts of the wing assembly 30. FIG. 11 is a rear view of the 3-D solid model of the wing assembly 30 illustrating a datum specification for the mating parts of the wing assembly 30. FIGS. 10 and 11 illustrate the secondary datum plane 502 and datum features 520, 522, 524 used to define the datum plane 502. The secondary datum plane 502 extends top to bottom and side-to-side within the wing assembly 30. In an example, the datum features 520, 522, 524 may be defined by the rear spar 552. The datum features 520, 522, 524 may be defined by the center hole 558 in the rear spar 552, or other features of the rear spar 552. FIG. 11 illustrates the datum features 520, 522, 524 on the rear surface of the rear spar 552. Other datum features may be used to define the secondary datum plane 502 in other examples.

Figure 12:
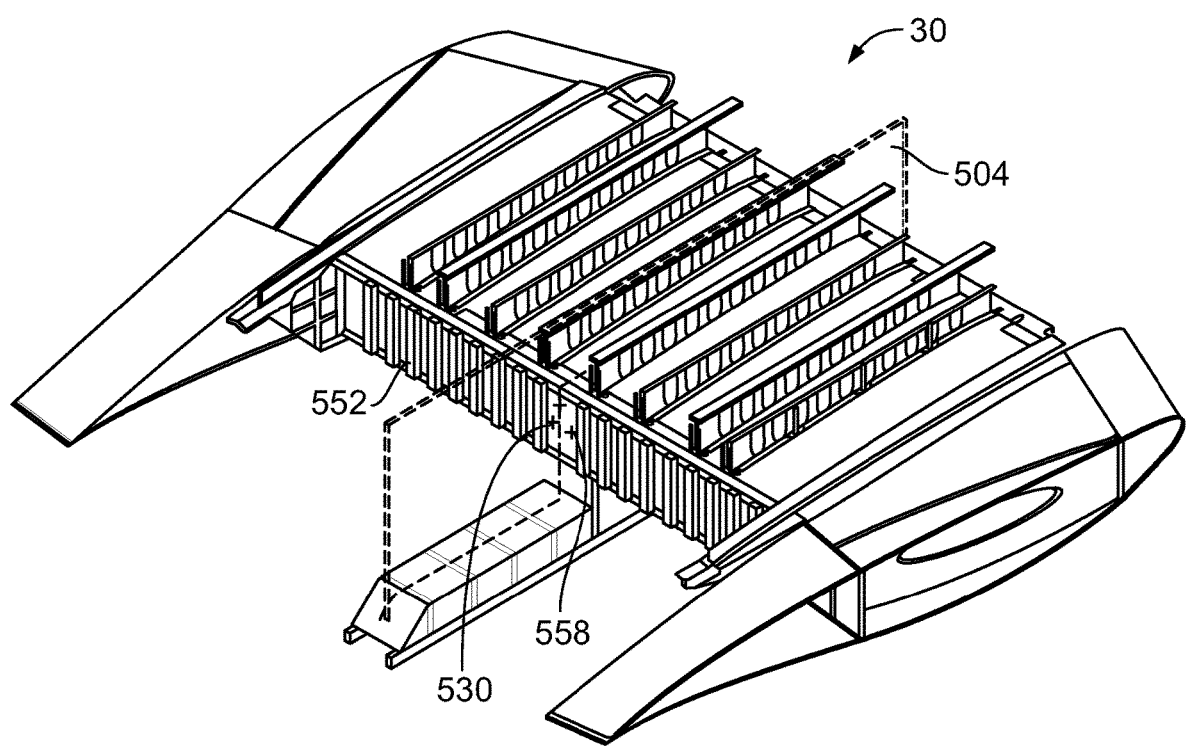
FIG. 12 is a rear perspective view of a 3-D solid model of the wing assembly illustrating a datum specification for the mating parts of the wing assembly in accordance with an example.

FIG. 12 is a rear perspective view of a 3-D solid model of the wing assembly 30 illustrating a datum specification for the mating parts of the wing assembly 30. FIG. 12 illustrates the tertiary datum plane 504 and datum feature 530 used to define the tertiary datum plane 504. The tertiary datum plane 504 extends top to bottom and front to rear within the wing assembly 30. In an example, the datum feature 530 may be defined by a hole in the rear spar 552. The datum feature 530 may be defined by surfaces, edges, holes or other features of the rear spar 552. FIG. 12 illustrates the datum feature 530 at the center hole 558 of the rear spar 552 and the tertiary datum plane 504 is mutually perpendicular to the primary and secondary datum planes 500, 502 located at the datum feature 530. Other datum features may be used to define the tertiary datum plane 504 in other examples.

Figure 13:
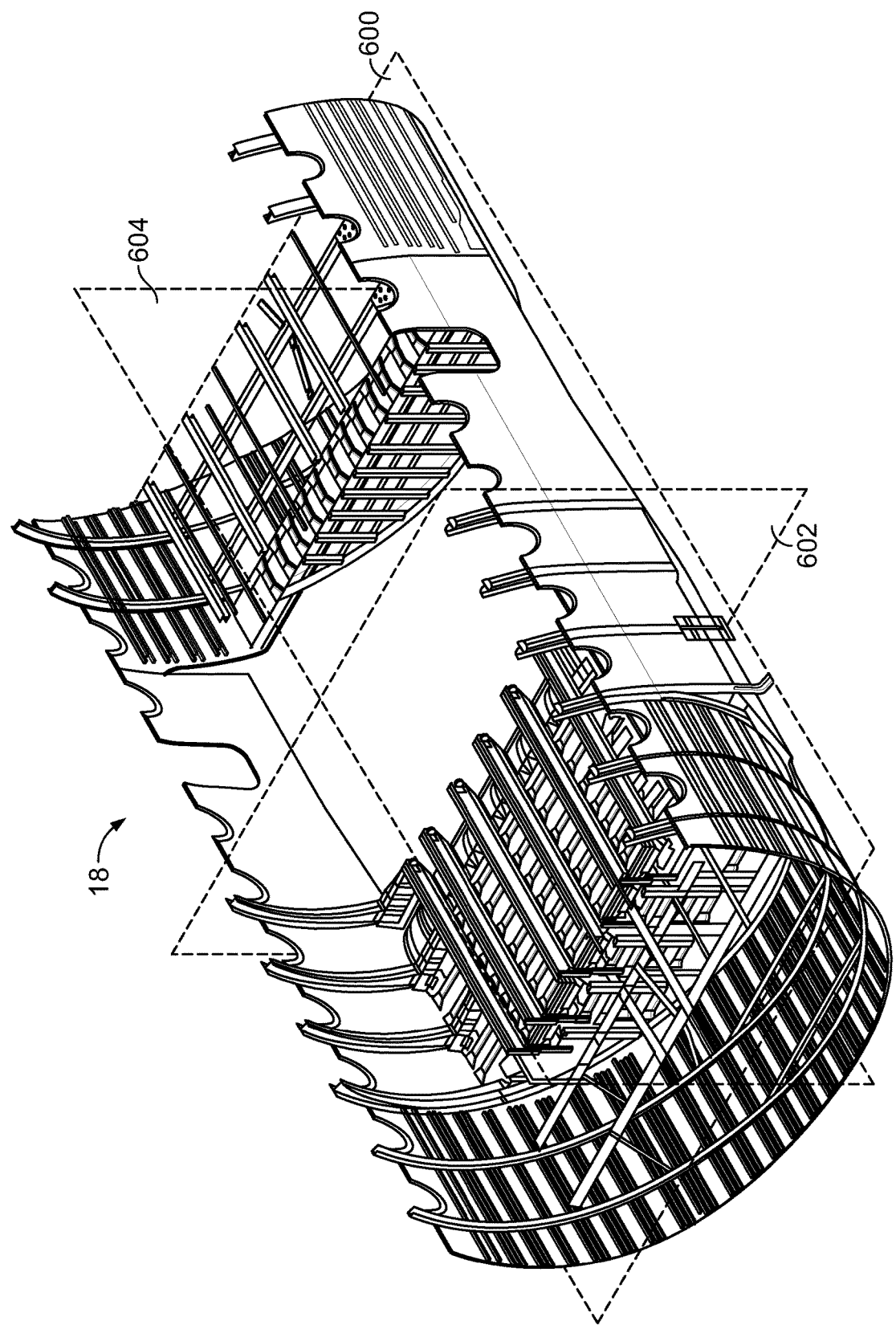
FIG. 13 is a cross-sectional view of a 3-D solid model of the fuselage illustrating a datum reference frame for the mating parts of the fuselage in accordance with an example.

FIG. 13 is a cross-sectional view of a 3-D solid model of the fuselage 18 illustrating the datum reference frame of the datum specification for the mating parts of the fuselage 18. FIG. 13 illustrates a primary datum plane 600, a secondary datum plane 602, and a tertiary datum plane 604. The datum planes 600, 602, 604 are mutually perpendicular fuselage datum planes. The primary datum plane 600 is a horizontal datum plane extending front to rear and side-to-side. The secondary datum plane 602 is a vertical datum plane extending top to bottom and side to side. The tertiary datum plane 604 is a vertical datum plane extending top to bottom and front to rear. The datum planes 600, 602, 604 are defined by datum features on corresponding mating parts of the fuselage 18.

Figure 14:
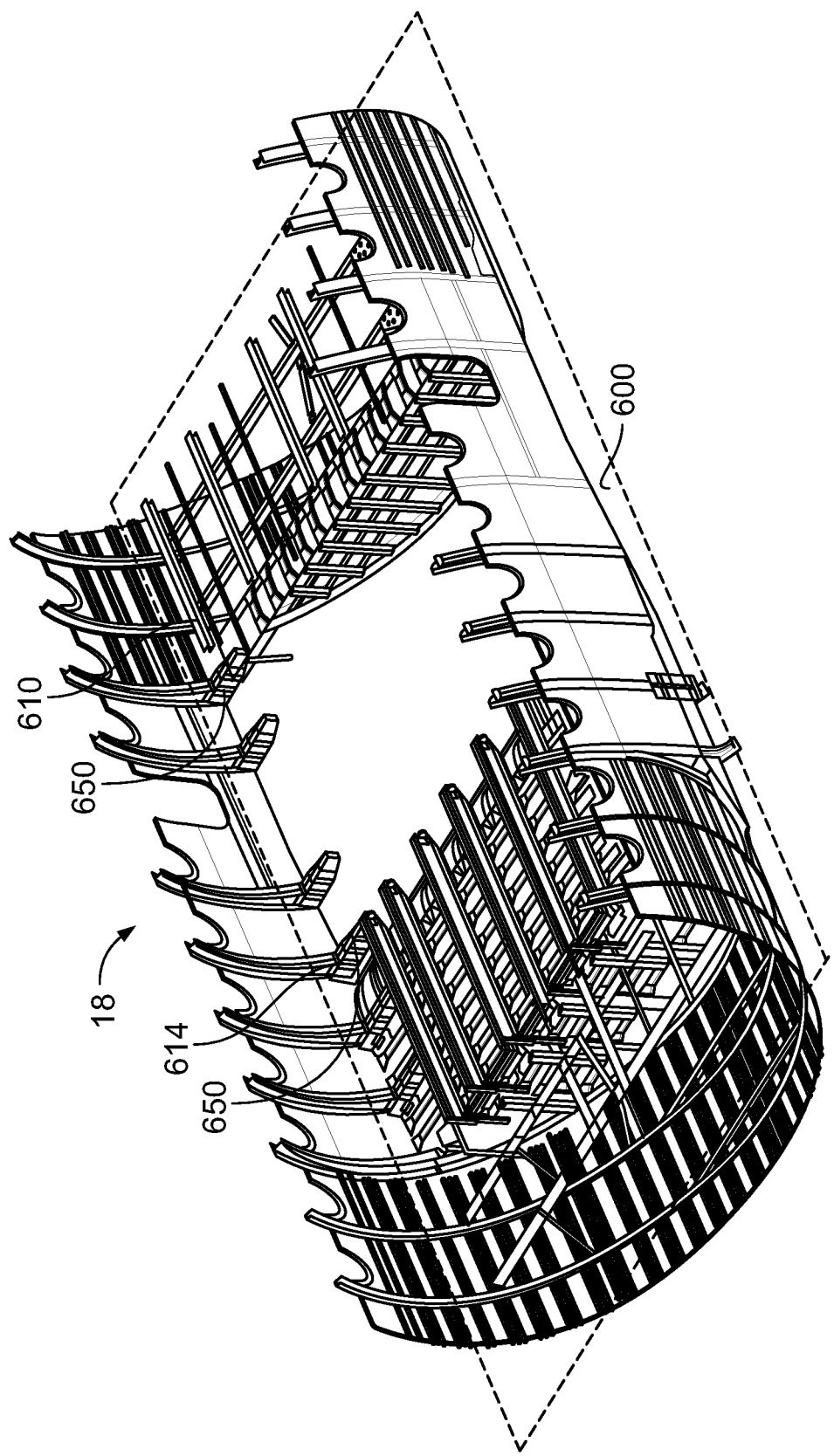
FIG. 14 is a cross-sectional view of a 3-D solid model of the fuselage illustrating a datum plane for the mating parts of the fuselage in accordance with an example.
Figure 15:
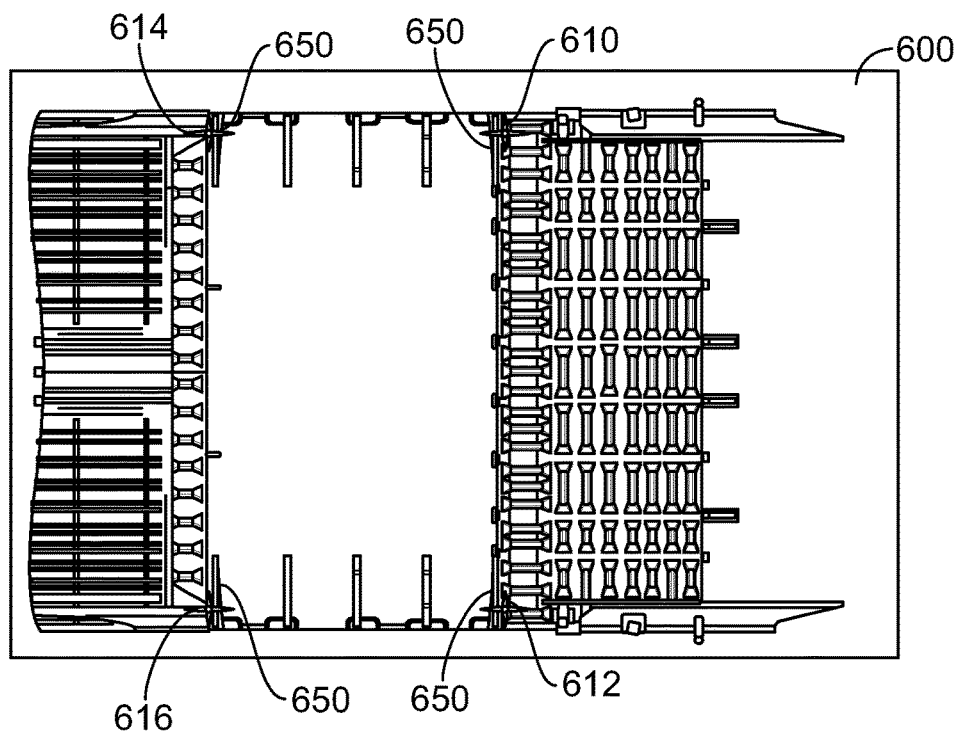
FIG. 15 is a top view of the 3-D solid model of the fuselage illustrating the datum features for the mating parts of the fuselage in accordance with an example.

FIG. 14 is a cross-sectional view of a 3-D solid model of the fuselage 18 illustrating a datum plane for the mating parts of the fuselage 18. FIG. 15 is a top view of the 3-D solid model of the fuselage 18 illustrating a datum specification for the mating parts of the fuselage 18. FIGS. 14 and 15 illustrate the primary datum plane 600 and datum features 610, 612, 614, 616 used to define the primary datum plane 600. The primary datum plane 600 extends front to rear and side-to-side within the fuselage 18. In an example, the datum features 610, 612, 614, 616 may be defined by corresponding upper split epsilon fittings 650. The datum features 610, 612, 614, 616 may be surfaces, edges, holes, or other features of the upper split epsilon fittings 650. The datum features 610, 612 may be defined by upper front spar split epsilon fittings 650 and the datum features 614, 616 may be defined by upper rear spar split epsilon fittings 650. Other datum features may be used to define the primary datum plane 600 in other examples.

Figure 16:
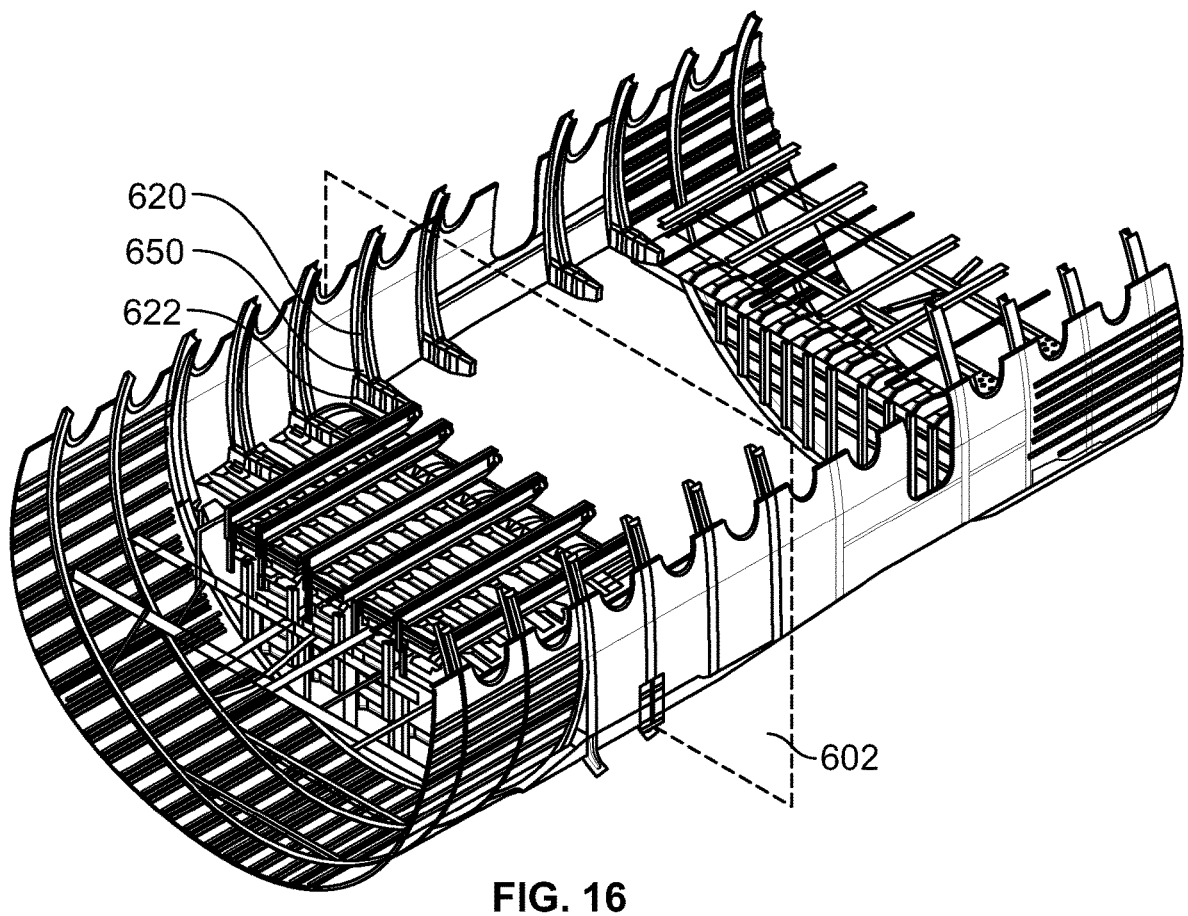
FIG. 16 is a cross-sectional view of a 3-D solid model of the fuselage illustrating a datum plane for the mating parts of the fuselage in accordance with an example.
Figure 17:
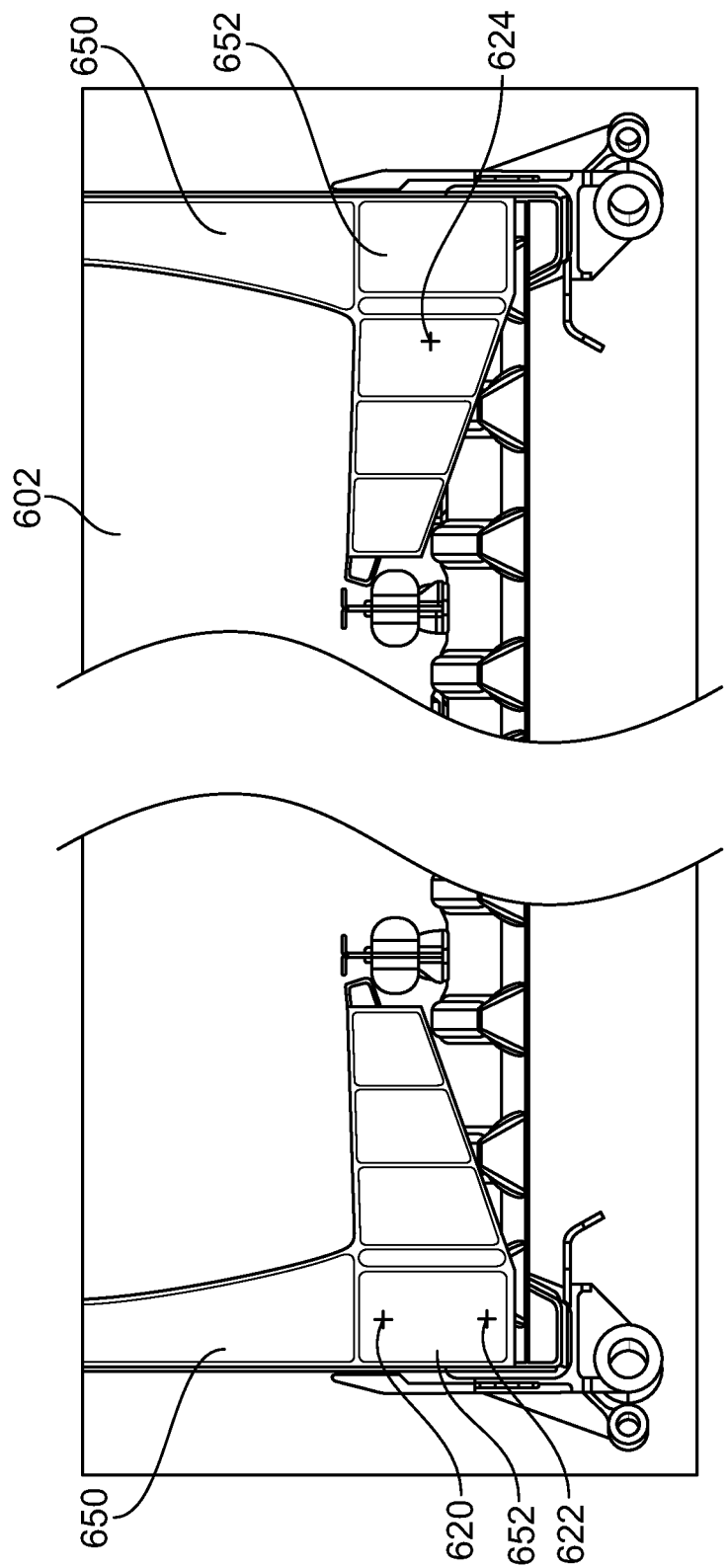
FIG. 17 is a front view of the 3-D solid model of the fuselage illustrating the datum features for the mating parts of the fuselage in accordance with an example.

FIG. 16 is a cross-sectional view of a 3-D solid model of the fuselage 18 illustrating a datum plane for the mating parts of the fuselage 18. FIG. 17 is a front view of the 3-D solid model of the fuselage 18 datum features for the mating parts of the fuselage 18. FIGS. 16 and 17 illustrate the secondary datum plane 602 and datum features 620, 622, 624 used to define the secondary datum plane 602. The secondary datum plane 602 extends top to bottom and side-to-side within the fuselage 18. In an example, the datum features 620, 622, 624 may be defined by corresponding upper split epsilon fittings 650, such as upper rear spar split epsilon fittings. The datum features 620, 622, 624 may be defined by surfaces, edges, holes, or other features of the upper rear spar split epsilon fittings. FIG. 17 illustrates the datum features 620, 622, 624 on the forward surfaces 652 of both the upper rear spar split epsilon fittings. Other datum features may be used to define the secondary datum plane 602 in other examples.

Figure 18:
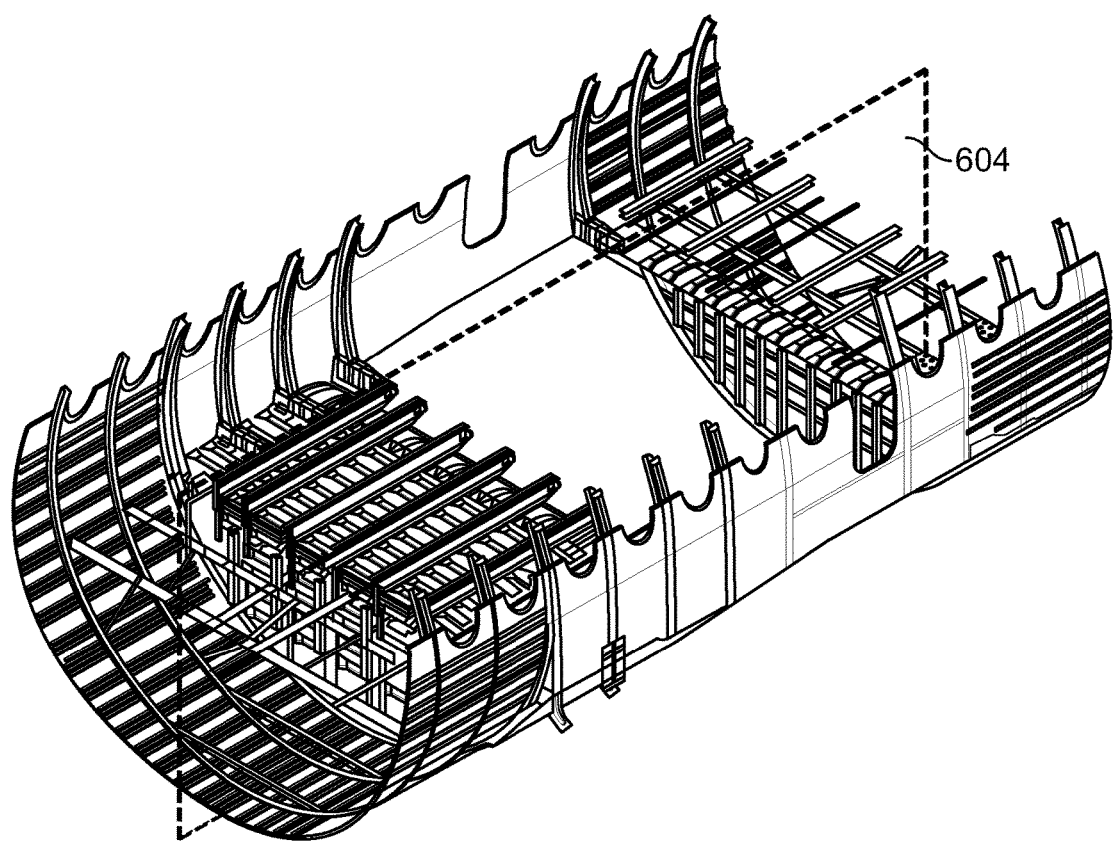
FIG. 18 is a cross-sectional view of a 3-D solid model of the fuselage illustrating a datum plane for the mating parts of the fuselage in accordance with an example.
Figure 19:
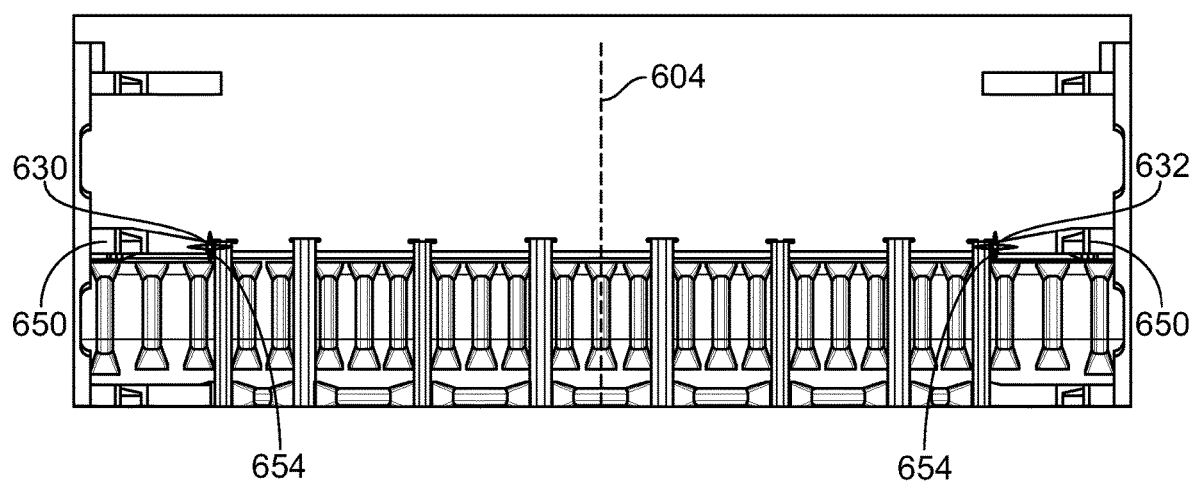
FIG. 19 is a top view of the 3-D solid model of the fuselage illustrating a datum features for the mating parts of the fuselage in accordance with an example.

FIG. 18 is a cross-sectional view of a 3-D solid model of the fuselage 18 illustrating a datum plane for the mating parts of the fuselage 18. FIG. 19 is a top view of the 3-D solid model of the fuselage 18 illustrating a datum specification for the mating parts of the fuselage 18. FIGS. 18 and 19 illustrate the tertiary datum plane 604 and datum features 630, 632 used to define the tertiary datum plane 604. The tertiary datum plane 604 extends top to bottom and front to rear within the fuselage 18. In an example, the datum features 630, 632 may be defined by corresponding upper split epsilon fittings 650, such as upper rear spar split epsilon fittings. The datum features 630, 632 may be defined by surfaces, edges, holes, or other features of the upper rear spar split epsilon fittings. FIG. 19 illustrates the datum features 630, 632 on the inboard surfaces 654 of both the right hand and the left hand upper rear spar split epsilon fittings 650. Other datum features may be used to define the tertiary datum plane 604 in other examples.

FIGS. 20-28 illustrate various examples of 3-D solid models of the aircraft components and mating parts of the aircraft components. The producibility analysis system 110 uses the 3-D solid models when performing the variation analysis to virtually simulate an assembly sequence of the first aircraft component and the second aircraft component to determine assembly analysis results between the corresponding mating parts. FIGS. 20-28 illustrate the aircraft components as the wing assembly 30 and the fuselage 18; however, as noted above, the variation analysis may be performed on other aircraft components during the manufacture of the aircraft 10. The producibility analysis system 110 develops an index specification for mating the mating parts of the first and second aircraft components. The index specification is defined by a plurality of index moves. In an example, the index moves are controlled by constraining the first and second aircraft components relative to each other within the six degrees of freedom (X, Y, Z, pitch, roll, yaw), such as to meet functional requirements. The index specification defines a build sequence used during manufacture and assembly of the aircraft 10. The index specification is used in performing the variation analysis.

Figure 20:
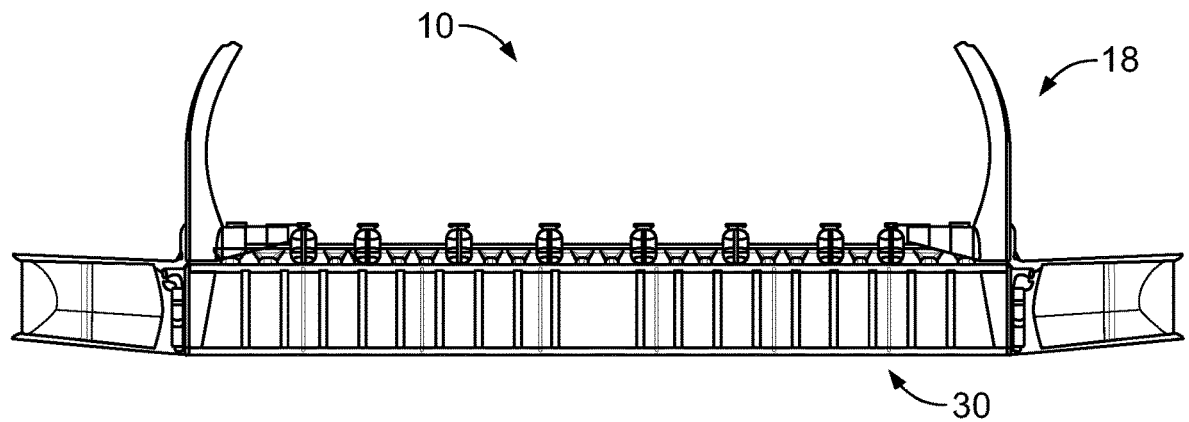
FIG. 20 is a cross-sectional view of a 3-D solid model of a portion of the aircraft illustrating the wing assembly positioned relative to the fuselage in accordance with an example.
Figure 21:
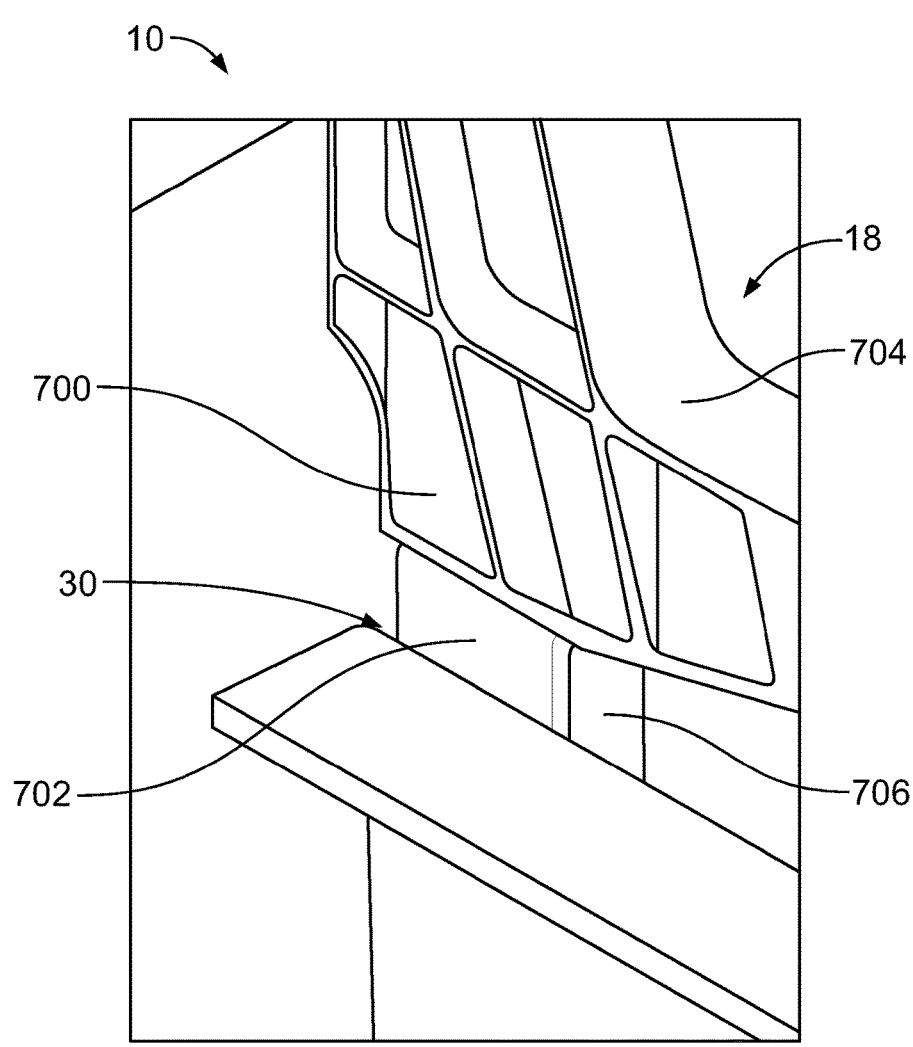
FIG. 21 is a front perspective view of a portion of the aircraft illustrating the wing assembly positioned relative to the fuselage in accordance with an example.

FIG. 20 is a cross-sectional view of a 3-D solid model of a portion of the aircraft 10 illustrating the wing assembly 30 positioned relative to the fuselage 18. FIG. 21 is a front perspective view of a portion of the aircraft 10 illustrating the wing assembly 30 positioned relative to the fuselage 18. A first index move of the index specification is used to initially position the wing assembly 30 relative to the fuselage 18. In an example, the first index move of the index specification aligns forward surfaces 700, 702 of the upper and lower rear spar split epsilon fittings 704, 706 on the right-hand side of the aircraft 10. FIG. 21 illustrates the forward surfaces 700, 702 of the upper and lower rear spar split epsilon fittings 704, 706 being aligned relative to each other. In an example, the first index move of the index specification sets the position of the wing assembly 30 relative to the fuselage 18 at the right-hand side of the aircraft 10 in the X direction (for example, front to rear). In an example, the wing assembly 30 undergoes one or more translating moves of the corresponding mating parts in a X direction and/or one or more translating moves of the corresponding mating parts in a Y direction and/or one or more translating moves of the corresponding mating parts in a Z direction to position the wing assembly 30 relative to the fuselage 18. For example, the wing assembly 30 may be moved to simulate movement from one station within the manufacturing facility to another station within the manufacturing facility by the component support tools 142.

Figure 22:
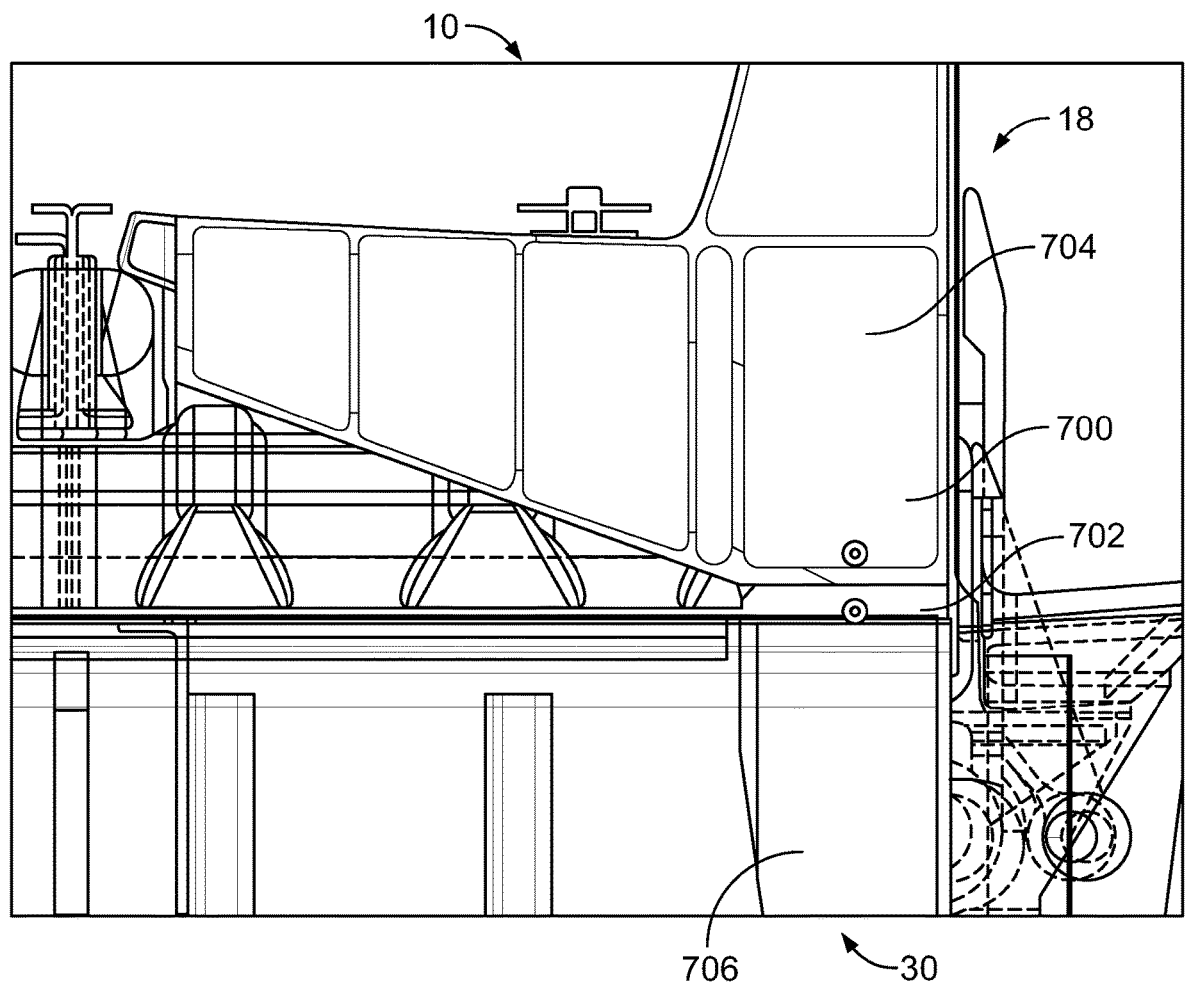
FIG. 22 is a front view of a portion of the aircraft illustrating the wing assembly positioned relative to the fuselage in accordance with an example.

FIG. 22 is a front view of a portion of the aircraft 10 illustrating the wing assembly 30 positioned relative to the fuselage 18. A second index move of the index specification is used to further align the wing assembly 30 relative to the fuselage 18. In an example, the second index move of the index specification aligns the forward surface 700, 702 of the upper and lower rear spar split epsilon fittings 704, 706 on the left-hand side of the aircraft 10. The second index move involves a rotating move of the wing assembly 30. In an example, the second index move of the index specification is used to set the yaw angle of the wing assembly 30. For example, the wing assembly 30 may be rotated about the Z axis to align the forward surfaces 700, 702 of the upper and lower rear spar split epsilon fittings 704, 706 on both the left-hand and the right-hand sides.

A third index move of the index specification is used to further align the wing assembly 30 relative to the fuselage 18. In an example, the third index move of the index specification aligns the upper and lower rear spar split epsilon fittings. The third index move involves a rotating move of the wing assembly 30. In an example, the third index move of the index specification is used to set the roll angle of the wing assembly 30. For example, the wing assembly 30 may be rotated about the X axis to align the forward surfaces 700, 702 of the upper and lower rear spar split epsilon fittings 704, 706 on both the left-hand side.

Figure 23:
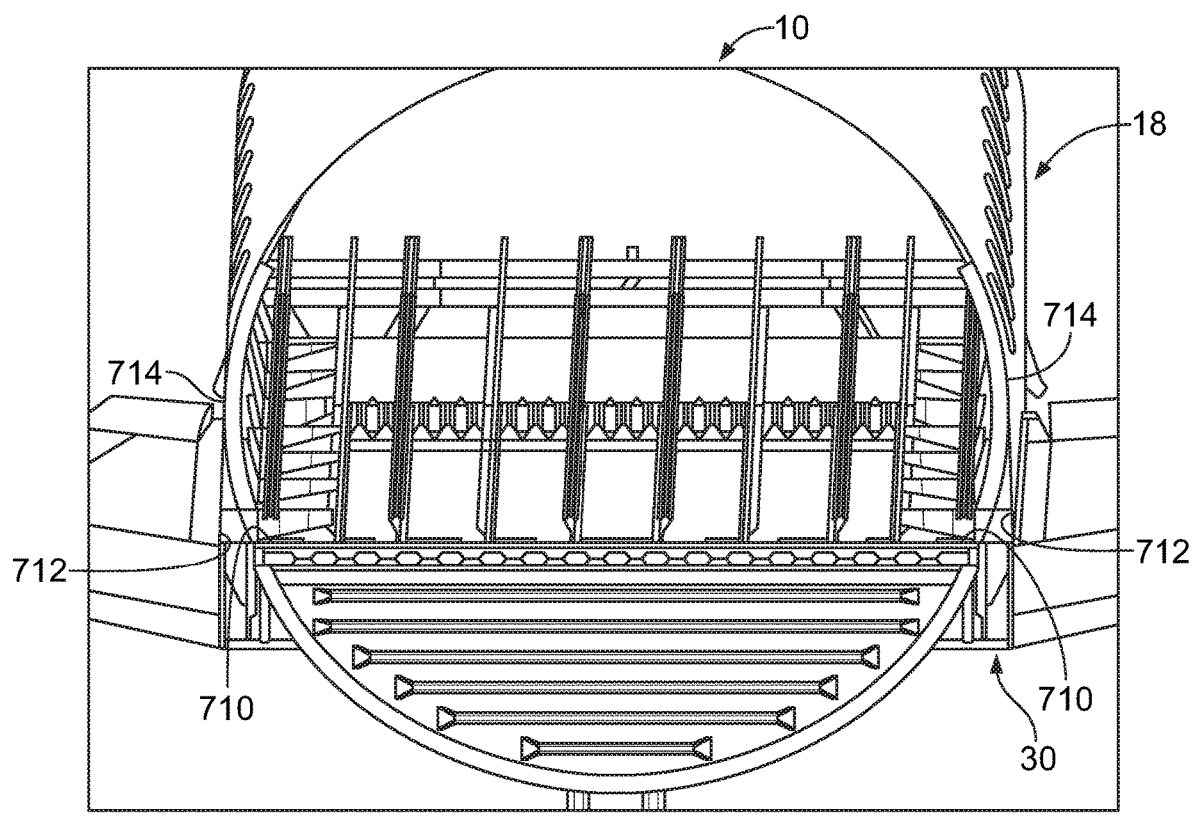
FIG. 23 is a front view of a portion of the aircraft illustrating the wing assembly positioned relative to the fuselage in accordance with an example.
Figure 24:
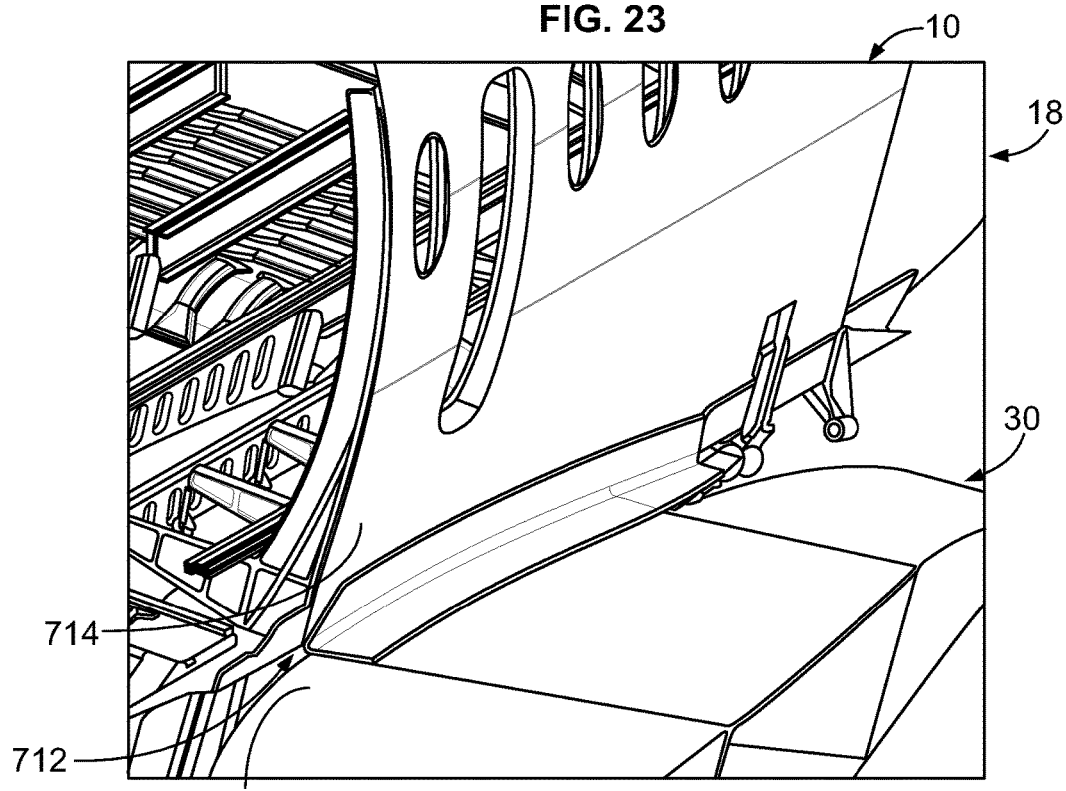
FIG. 24 is a front perspective view of a portion of the aircraft illustrating the wing assembly positioned relative to the fuselage in accordance with an example.

FIG. 23 is a front view of a portion of the aircraft 10 illustrating the wing assembly 30 positioned relative to the fuselage 18. FIG. 24 is a front perspective view of a portion of the aircraft 10 illustrating the wing assembly 30 positioned relative to the fuselage 18. A fourth index move of the index specification is used to further align the wing assembly 30 relative to the fuselage 18. The fourth index move involves a translating move of the wing assembly 30 in the Y direction. In an example, the fourth index move centers the skin of the fuselage 18 between over wing chords 710 on the left and right hand sides of the wing assembly 30 to equalize gaps 712 between the fuselage skin 714 and the over wing chords 710 on both sides. In an example, the fourth index move of the index specification sets the position of the wing assembly 30 relative to the fuselage 18 in the Y direction (for example, side to side).

Figure 25:
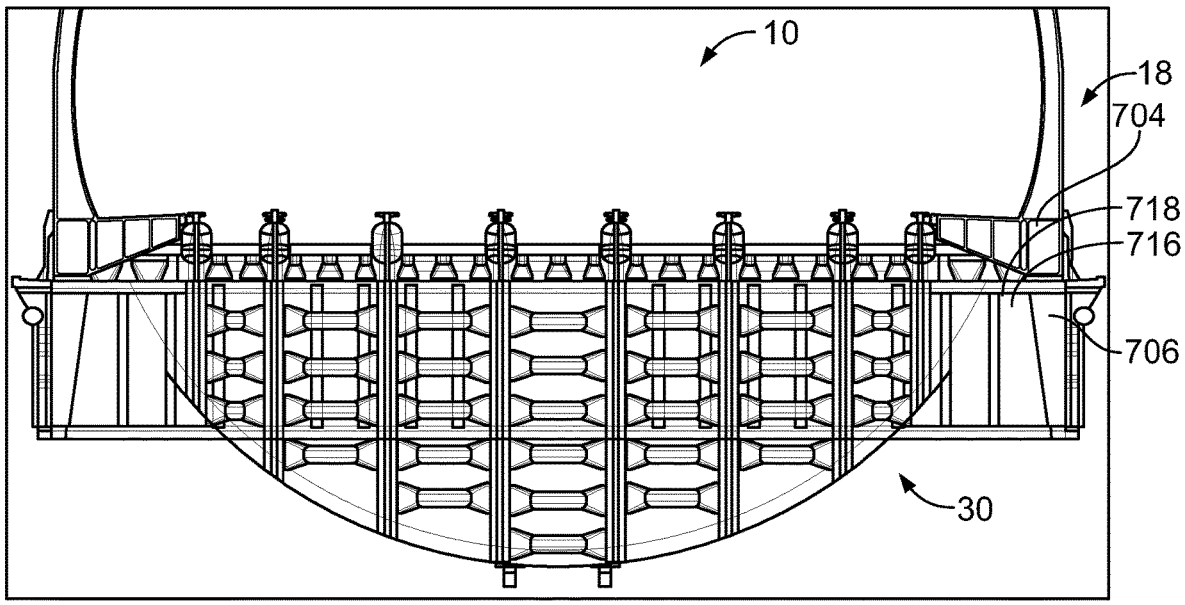
FIG. 25 is a cross-sectional view of a portion of the aircraft illustrating the wing assembly positioned relative to the fuselage in accordance with an example.
Figure 26:
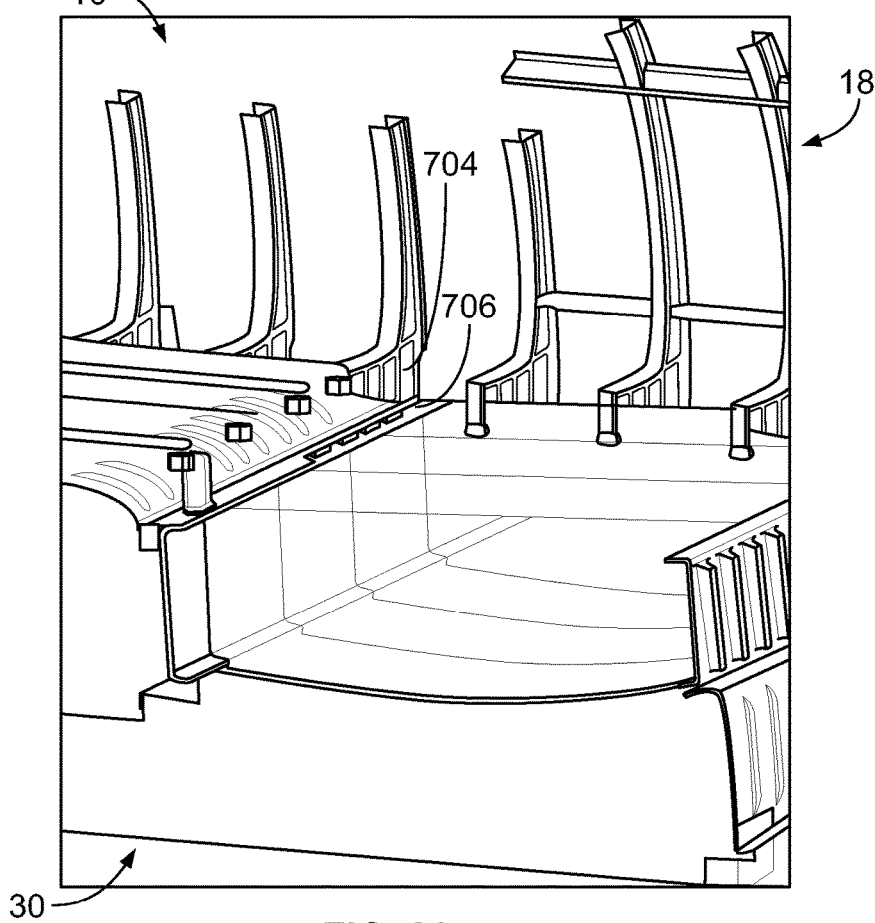
FIG. 26 is a cross-sectional view of a portion of the aircraft illustrating the wing assembly positioned relative to the fuselage in accordance with an example.

FIG. 25 is a cross-sectional view of a portion of the aircraft 10 illustrating the wing assembly 30 positioned relative to the fuselage 18. FIG. 26 is a cross-sectional view of a portion of the aircraft 10 illustrating the wing assembly 30 positioned relative to the fuselage 18. A fifth index move of the index specification is used to further align the wing assembly 30 relative to the fuselage 18. In an example, the fifth index move of the index specification mates the upper and lower rear spar split epsilon fittings 704, 706. The top surfaces 716 of the lower rear spar split epsilon fittings 706 are mated to the bottom surfaces 718 of the upper rear spar split epsilon fittings 704. The fifth index move involves a translating move of the wing assembly 30 in the Z direction. In an example, the fifth index move of the index specification is used to set the position of the wing assembly 30 relative to the fuselage 18 in the Z direction (for example, top to bottom).

Figure 27:
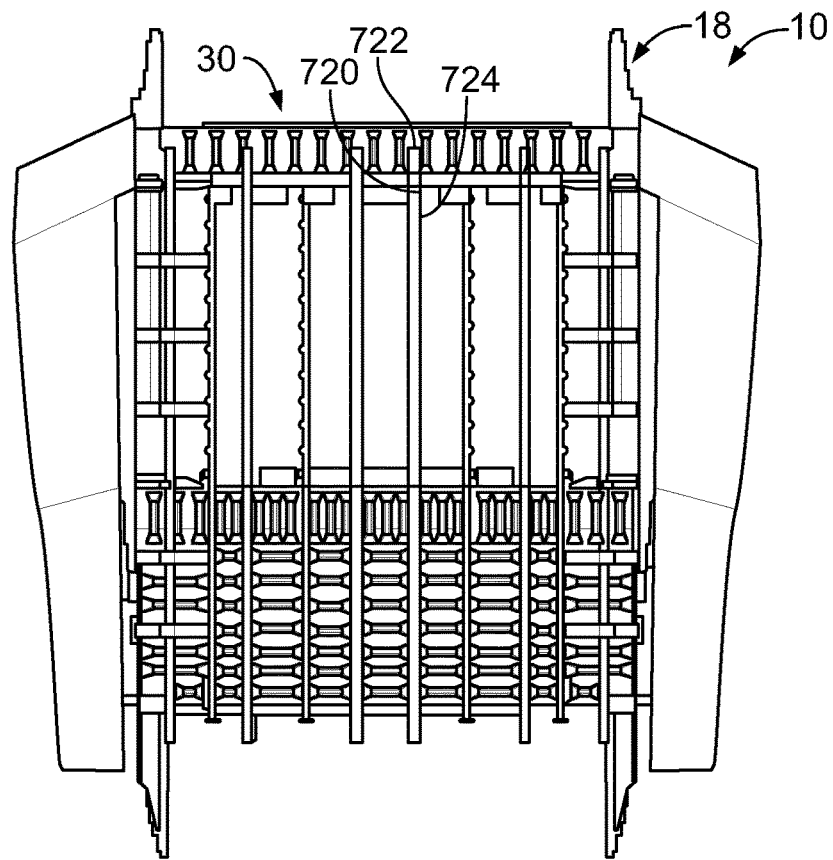
FIG. 27 illustrates a portion of the aircraft showing the wing assembly positioned relative to the fuselage in accordance with an example.
Figure 28:
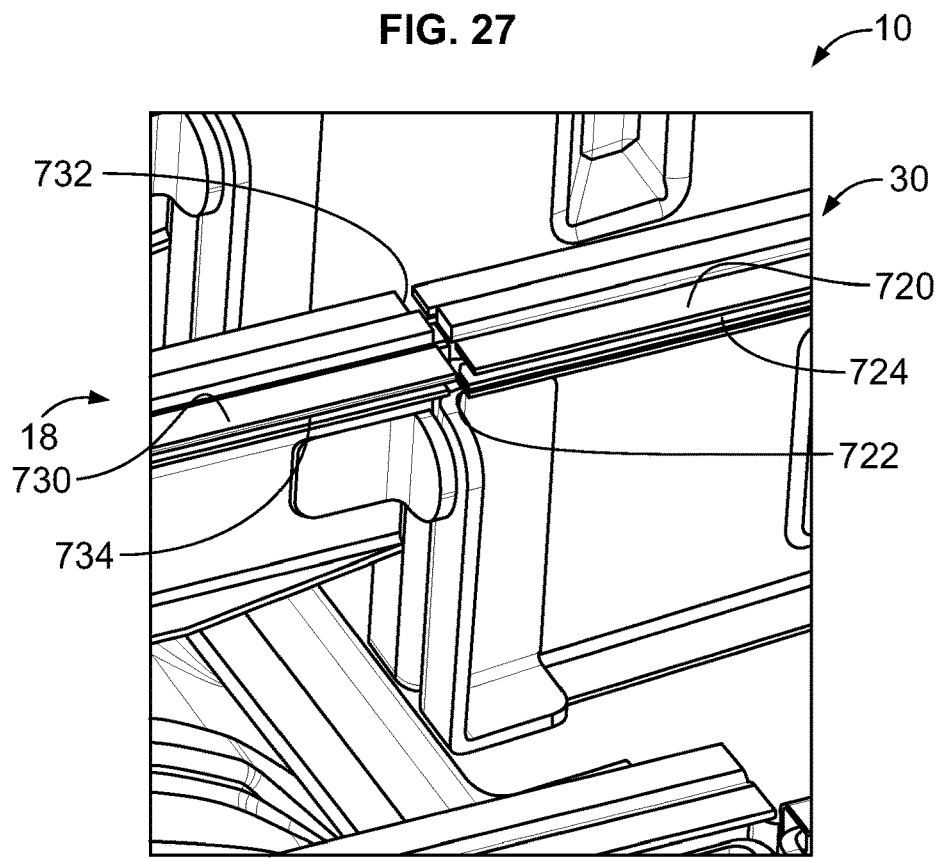
FIG. 28 is a perspective view of a portion of the aircraft illustrating the wing assembly positioned relative to the fuselage in accordance with an example.

FIG. 27 illustrates a portion of the aircraft 10 showing the wing assembly 30 positioned relative to the fuselage 18. FIG. 28 is a perspective view of a portion of the aircraft 10 illustrating the wing assembly 30 positioned relative to the fuselage 18. A sixth index move of the index specification is used to further align the wing assembly 30 relative to the fuselage 18. In an example, the sixth index move of the index specification aligns the top surfaces 720 of the forward ends 722 of the seat tracks 724 on the wing assembly 30 with the top surfaces 730 of the aft ends 732 of the seat tracks 734 on the fuselage 18. The sixth index move involves a rotating move of the wing assembly 30. In an example, the sixth index move of the index specification is used to set the pitch angle of the wing assembly 30. For example, the wing assembly 30 may be rotated about the Y axis to align the seat tracks 724, 734.

In an example, the sixth index move may affect the Z positioning of the upper and lower rear spar split epsilon fittings. The fifth index move of the index specification may be reiterated after the sixth index move of the index specification to readjust the Z positioning of the upper and lower rear spar split epsilon fittings 704, 706. The sixth index move may be reiterated. The fifth and sixth index moves may be reiterated multiple times to achieve a best fit between setting the pitch angle and setting the Z positioning of the components. In an example, the index specification ends on a Z positioning move, such as the fifth index move, due to tighter assembly tolerances between the rear spar split epsilon fittings 704, 706 than the assembly tolerances of the seat tracks 724, 734.

In other examples, the index moves may be performed in a different order. Additional index moves may be utilized when aligning different datum features of the wing assembly 30 and the fuselage 18. Different index moves may be utilized when performing a variation analysis on different aircraft components.

The index moves define the build sequence for assembly of the aircraft components. The variation analysis is performed to virtually simulate assembly of the aircraft components to determine that the assembly analysis results comply with assembly tolerances. The variation analysis is used to verify that the build sequence is within the manufacturing capability of the manufacturing facility for producing the aircraft 10. If one or more of the assembly analysis results are out of specification, the structural dimensional requirements may be revised and a different build sequence may be developed by performing a variation analysis using the revised datum specification and index specification based on the revised structural dimensional requirements.

It is to be understood that the above description is intended to be illustrative, and not restrictive. For example, the above-described examples (and/or aspects thereof) may be used in combination with each other. In addition, many modifications may be made to adapt a particular situation or material to the teachings of the disclosure without departing from its scope. Dimensions, types of materials, orientations of the various components, and the number and positions of the various components described herein are intended to define parameters of certain examples, and are by no means limiting and are merely examples. Many other examples and modifications within the spirit and scope of the claims will be apparent to those of skill in the art upon reviewing the above description. The scope of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A method for producing an aircraft, the method comprising:
   determining structural dimensional requirements for mating parts of a first aircraft component, for mating parts of a second aircraft component, and for assembly tolerances between the mating parts of the first and second aircraft components;
   developing a datum specification for the mating parts of the first aircraft component and for the mating parts of the second aircraft component;
   developing a virtual index specification, the index specification defining a virtual assembly sequence for simulated mating of the mating parts of the first aircraft component with the mating parts of the second aircraft component;
   performing a virtual variation analysis based on the datum specification and the virtual index specification to virtually simulate and determine assembly analysis results for the mating parts of the first and second aircraft components; and comparing the assembly analysis results for the mating parts of the first and second aircraft components with the assembly tolerances determined by the structural dimensional requirements for the mating parts of the first and second aircraft components to verify that the datum specification and the index specification meet the assembly tolerances between the mating parts of the first and second aircraft components.

2. The method of claim 1, wherein said performing a variation analysis comprises using a 3-D control system to virtually simulate assembly of the first aircraft component and the second aircraft component to determine the assembly analysis results for the mating parts of the first and second aircraft components.

3. The method of claim 1, further comprising verifying that the assembly analysis results are within a manufacturing capability of a manufacturing facility for producing the aircraft.

4. The method of claim 1, further comprising revising at least one of a) the structural dimensional requirements for the mating parts of the first aircraft component; b) the structural dimensional requirements for the mating parts of the second aircraft component; and c) the structural dimensional requirements for the assembly tolerances.

5. The method of claim 4, further comprising:
revising the datum specification based on the revised structural dimensional requirements; and
revising the index specification based on the revised structural dimensional requirements and the revised datum specification.

6. The method of claim 5, further comprising:
iterating the variation analysis based on the revised datum specification and the revised index specification to determine revised assembly analysis results; and
verifying that the revised assembly analysis results are within a manufacturing capability of a manufacturing facility for producing the aircraft.

7. The method of claim 1, further comprising assembling the first aircraft component with the second aircraft component according to an assembly sequence defined by the index specification and the datum specification.

8. The method of claim 1, wherein said developing a datum specification comprises defining primary datum features of a first mating part of the first aircraft component and defining secondary datum features of a first mating part of the second aircraft component, and wherein said developing an index specification comprises developing an assembly sequence to position the primary datum features and the secondary datum features relative to each other for joining.

9. The method of claim 1, wherein said developing a datum specification comprises defining three mutually perpendicular first aircraft component datum planes for the mating parts of the first aircraft component and defining three mutually perpendicular second aircraft component datum planes for the mating parts of the second aircraft component.

10. The method of claim 1, wherein said developing a datum specification comprises defining a primary datum feature at a surface of a first mating part of the first aircraft component and defining a secondary datum feature at a surface of a first mating part of the second aircraft component, and wherein said developing an index specification comprises developing an assembly sequence to position the primary datum feature and the secondary datum feature relative to each other for joining.

11. The method of claim 1, wherein said developing a datum specification comprises developing a datum specification for a lower rear spar split epsilon fitting, a lower front spar split epsilon fitting, an upper rear spar split epsilon fitting, and an upper front spar split epsilon fitting, wherein the lower rear spar split epsilon fitting and the lower front spar split epsilon fitting are mating parts of the first aircraft component, and wherein the upper rear spar split epsilon fitting and the upper front spar split epsilon fitting are mating parts of the second aircraft component.

12. The method of claim 1, wherein said developing an index specification comprises defining an assembly sequence for the first aircraft component and the second aircraft component, the assembly sequence including a) one or more translating moves of the mating parts of at least one of the first aircraft component or the second aircraft component in a X direction; b) one or more translating moves of the mating parts of at least one of the first aircraft component or the second aircraft component in a Y direction; c) one or more translating moves of the mating parts of at least one of the first aircraft component or the second aircraft component in a Z direction; d) one or more rotating moves of the mating parts of at least one of the first aircraft component or the second aircraft component at a pitch angle; e) one or more rotating moves of the mating parts of at least one of the first aircraft component or the second aircraft component at a roll angle; and f) one or more rotating moves of the mating parts of at least one of the first aircraft component or the second aircraft component at a yaw angle.

13. The method of claim 1, wherein the first aircraft component is a wing assembly including a center wing section, a right wing section, and a left wing section, the mating parts of the wing assembly including a lower rear spar split epsilon fitting, a lower front spar split epsilon fitting, over wing chords, and a wing assembly keel beam, and wherein the second aircraft component is a fuselage including a mid-body section configured to receive the wing assembly, the mating parts of the fuselage including an upper rear spar split epsilon fitting, an upper front spar split epsilon fitting, a fuselage longeron, and a fuselage keel beam, said performing a variation analysis comprises a) determining assembly analysis results between the lower rear spar split epsilon fitting and the upper rear spar split epsilon fitting; b) determining assembly analysis results between the lower front spar split epsilon fitting and the upper front spar split epsilon fitting; c) determining assembly analysis results between the over wing chords and the fuselage longeron; and d) determining assembly analysis results between the wing assembly keel beam and the fuselage keel beam.

14. A method for producing an aircraft, the method comprising:
determining structural dimensional requirements for mating parts of a first aircraft component, for mating parts of a second aircraft component, and for assembly tolerances between the mating parts of the first and second aircraft components;
developing a datum specification for the mating parts of the first aircraft component and for the mating parts of the second aircraft component;
developing a virtual index specification, the index specification defining a virtual assembly sequence for simulated mating of the mating parts of the first and second aircraft components;
performing a virtual variation analysis based on the datum specification and the virtual index specification to virtually simulate and determine assembly analysis results for the mating parts of the first and second aircraft components;

comparing the assembly analysis results for the mating parts of the first and second aircraft components with the assembly tolerances determined by the structural dimensional requirements for the mating parts of the first and second aircraft components to verify that the datum specification and the index specification meet the assembly tolerances between the mating parts of the first and second aircraft components; and assembling the first aircraft component with the second aircraft component according to the assembly sequence based on the index specification and the datum specification.

15. A method for producing an aircraft by a wing-to-body-join assembly, the method comprising:

determining structural dimensional requirements for wing assembly mating parts of a wing assembly including a center wing section, a right wing section attached to the center wing section, and a left wing section attached to the center wing section;

determining structural dimensional requirements for fuselage mating parts of a fuselage including a mid-body section configured to receive the wing assembly;

determining structural dimensional requirements for assembly tolerances between the wing assembly mating parts and the fuselage mating parts;

developing a datum specification for the wing assembly mating parts and for the fuselage mating parts;

developing a virtual index specification, the index specification defining a virtual assembly sequence for simulated mating of the wing assembly mating parts with the fuselage mating parts;

performing a virtual variation analysis based on the datum specification and the virtual index specification to virtually simulate and determine assembly analysis results for the wing assembly mating parts and the fuselage mating parts; and comparing the assembly analysis results for the wing assembly mating parts and the fuselage mating parts with the assembly tolerances determined by the structural dimensional requirements for the wing assembly mating parts and the fuselage mating parts to verify that the datum specification and the index specification meet the assembly tolerances between the wing assembly mating parts and the fuselage mating parts.

16. The method of claim 15, wherein said performing a variation analysis comprises using a 3-D control system to virtually simulate assembly of the wing assembly and the fuselage to determine assembly analysis results between the wing assembly mating parts and the fuselage mating parts.

17. The method of claim 15, further comprising verifying that the assembly analysis results are within a manufacturing capability of a manufacturing facility for producing the aircraft.

18. The method of claim 15, further comprising revising at least one of a) the structural dimensional requirements for the wing assembly mating parts; b) the structural dimensional requirements for the fuselage mating parts; and c) the structural dimensional requirements for the assembly tolerances.

19. The method of claim 18, further comprising:
revising the datum specification based on the revised structural dimensional requirements; and
revising the index specification based on the revised structural dimensional requirements and the revised datum specification.

20. The method of claim 19, further comprising:
iterating the variation analysis based on the revised datum specification and the revised index specification to determine revised assembly analysis results; and
verifying that the revised assembly analysis results are within a manufacturing capability of a manufacturing facility for producing the aircraft.

21. The method of claim 15, further comprising assembling the wing assembly with the fuselage according to an assembly sequence defined by the index specification and the datum specification.

22. The method of claim 15, wherein said developing a datum specification comprises defining primary datum features of a first mating part of the wing assembly based on the assembly tolerances and defining primary datum features of a first mating part of the fuselage, and wherein said developing an index specification comprises developing an assembly sequence to position the primary datum features of the first mating parts relative to each other for joining.

23. The method of claim 15, wherein said developing a datum specification comprises defining three mutually perpendicular wing assembly datum planes for the wing assembly mating parts and defining three mutually perpendicular fuselage datum planes for the fuselage mating parts corresponding to the wing assembly datum planes.

24. The method of claim 15, wherein said developing a datum specification comprises defining a first datum feature at an upper surface of a first wing assembly mating part and at a rear edge of the upper surface and defining a second datum feature at a lower surface of a first fuselage mating part and at a rear edge of the lower surface, and wherein said developing an index specification comprises developing an assembly sequence to position the first datum feature and the second datum feature relative to each other for joining.

25. The method of claim 15, wherein said developing a datum specification comprises developing a datum specification for a lower rear spar split epsilon fitting, a lower front spar split epsilon fitting, an upper rear spar split epsilon fitting, and an upper front spar split epsilon fitting, wherein the lower rear spar split epsilon fitting and the lower front spar split epsilon fitting are wing assembly mating parts, and wherein the upper rear spar split epsilon fitting and the upper front spar split epsilon fitting are fuselage mating parts.

26. The method of claim 15, wherein said developing an index specification comprises defining an assembly sequence for the wing assembly and the fuselage, the assembly sequence including a) one or more translating moves of the wing assembly mating parts in a X direction; b) one or more translating moves of the wing assembly mating parts in a Y direction; c) one or more translating moves of the wing assembly mating parts in a Z direction; d) one or more rotating moves of the wing assembly mating parts at a pitch angle; e) one or more rotating moves of the wing assembly mating parts at a roll angle; and f) one or more rotating moves of the wing assembly mating parts at a yaw angle.

27. The method of claim 15, wherein the wing assembly mating parts include a lower rear spar split epsilon fitting, a lower front spar split epsilon fitting, over wing chords, and a wing assembly keel beam, and wherein the fuselage mating parts include an upper rear spar split epsilon fitting, an upper front spar split epsilon fitting, a fuselage longeron, and a fuselage keel beam, said performing a variation analysis comprises a) determining assembly analysis results between the lower rear spar split epsilon fitting and the upper rear spar split epsilon fitting; b) determining assembly analysis results between the lower front spar split epsilon fitting and the upper front spar split epsilon fitting; c) determining assembly analysis results between the over wing chords and the fuselage longeron; and d) determining assembly analysis results between the wing assembly keel beam and the fuselage keel beam.

* * * * *